United States Patent
Xu et al.

(10) Patent No.: US 11,804,888 B2
(45) Date of Patent: Oct. 31, 2023

(54) ELECTRONIC DEVICE, WIRELESS COMMUNICATION METHOD AND COMPUTER-READABLE MEDIUM

(71) Applicant: Sony Group Corporation, Tokyo (JP)

(72) Inventors: Jin Xu, Beijing (CN); Wenjing Ren, Beijing (CN); Ying Zhou, Beijing (CN); Dongru Li, Beijing (CN); Qimei Cui, Beijing (CN); Jianfei Cao, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 182 days.

(21) Appl. No.: 17/295,877

(22) PCT Filed: Jan. 6, 2020

(86) PCT No.: PCT/CN2020/070442
§ 371 (c)(1),
(2) Date: May 21, 2021

(87) PCT Pub. No.: WO2020/143568
PCT Pub. Date: Jul. 16, 2020

(65) Prior Publication Data
US 2022/0014253 A1   Jan. 13, 2022

(30) Foreign Application Priority Data
Jan. 10, 2019  (CN) .......................... 201910024037.0

(51) Int. Cl.
*H04B 7/06*      (2006.01)
*H04W 74/00*   (2009.01)
(Continued)

(52) U.S. Cl.
CPC ........ *H04B 7/0695* (2013.01); *H04W 74/004* (2013.01); *H04W 74/0841* (2013.01); *H04W 74/0866* (2013.01); *H04W 76/19* (2018.02)

(58) Field of Classification Search
CPC .............. H04B 7/0695; H04W 74/004; H04W 74/0841; H04W 74/0866; H04W 76/19;
(Continued)

(56) References Cited

U.S. PATENT DOCUMENTS

2015/0103741 A1* 4/2015 Uchino ............. H04W 56/0045
                                                                 370/328
2018/0234960 A1   8/2018 Sumeeth
(Continued)

FOREIGN PATENT DOCUMENTS

CN       102448078 A    5/2012
CN       107733501 A    2/2018
(Continued)

OTHER PUBLICATIONS

International Search Report and Written Opinion dated Mar. 6, 2020, received for PCT Application PCT/CN2020/070442, Filed on Jan. 6, 2020, 11 pages including English Translation.
(Continued)

*Primary Examiner* — Harry H Kim
(74) *Attorney, Agent, or Firm* — XSENSUS LLP

(57) ABSTRACT

The present invention relates to an electronic device, a wireless communication method and a computer-readable medium. The electronic apparatus for wireless communication according to one embodiment comprises a processing circuit. The processing circuit is configured to perform control to carry out carrier aggregation communication with a base station by means of at least a first cell and a second cell. The processing circuit is further configured to perform
(Continued)

control to send first information for beam failure recovery of the second cell to the base station by means of the first cell.

17 Claims, 16 Drawing Sheets

(51) Int. Cl.
  *H04W 74/08* (2009.01)
  *H04W 76/19* (2018.01)
  *H04L 5/00* (2006.01)
  *H04W 76/15* (2018.01)
  *H04W 24/04* (2009.01)
(58) Field of Classification Search
  CPC ... H04W 76/15; H04W 24/04; H04W 72/046;
    H04W 72/23; H04L 5/0098; H04L 5/001;
    H04L 5/0042; H04L 5/0053
  See application file for complete search history.

(56) References Cited

U.S. PATENT DOCUMENTS

| | | | |
|---|---|---|---|
| 2018/0279287 A1 | 9/2018 | John Wilson et al. | |
| 2021/0006457 A1* | 1/2021 | You | H04L 5/0085 |
| 2021/0194566 A1* | 6/2021 | Shi | H04B 7/088 |
| 2021/0385896 A1* | 12/2021 | Kim | H04W 36/0027 |
| 2021/0409094 A1* | 12/2021 | Yuan | H04W 72/23 |
| 2022/0294512 A1* | 9/2022 | Matsumura | H04W 76/19 |
| 2022/0295589 A1* | 9/2022 | Tsai | H04B 17/309 |

FOREIGN PATENT DOCUMENTS

| | | |
|---|---|---|
| CN | 108513737 A | 9/2018 |
| WO | 2016119851 A1 | 8/2016 |
| WO | 2017024659 A1 | 2/2017 |

OTHER PUBLICATIONS

Spreadtrum Communications, "Beam Failure Recovery on Scell", 3GPP TSG-RAN WG2 Meeting #101 bis, R2-1804475, Apr. 16-20, 2018, 2 pages.
Huawei et al., "Beam Failure Recovery on Scell", 3GPP TSG-RAN WG2 #101, R2-1801814, Feb. 26-Mar. 2, 2018, 2 pages.
Intel Corporation, "On SCell Beam Failure Recovery", 3GPP TSG RAN WGI Meeting #94, R1-1808720, Aug. 20-24, 2018, pp. 1-4.

* cited by examiner

ELECTRONIC DEVICE, WIRELESS COMMUNICATION METHOD AND COMPUTER-READABLE MEDIUM

CROSS-REFERENCE TO RELATED APPLICATIONS

The present application is based on PCT filing PCT/CN2020/070442, filed Jan. 6, 2020, which claims the priority to Chinese Patent Application No. 201910024037.0, titled "ELECTRONIC DEVICE, WIRELESS COMMUNICATION METHOD AND COMPUTER-READABLE MEDIUM", filed on Jan. 10, 2019 with the Chinese Patent Office, each of which is incorporated herein by reference in its entirety.

TECHNICAL FIELD

The present disclosure generally relates to the field of wireless communications, and in particular to an electronic device for wireless communication, a wireless communication method, and a computer readable medium.

BACKGROUND

A beam failure recovery (BFR) process at user equipment (UE) includes: beam failure detection (BFD), new candidate beam identification (NBI), sending a beam failure recovery request (BFRQ), and monitoring a response of a base station (gNB) to the beam failure recovery request.

Specifically, as shown in FIG. 10, in S1002, a beam failure condition may be determined in a case that an assumed block error rate (BLER) of each of reference signals (RSs) is higher than a threshold. In S1004, it may be considered that a beam failure occurs in a case that N beam failure conditions have been determined. In S1006, UE determines a candidate beam, and may identify a physical random access channel (PRACH) for carrying a BFR request based on the newly determined beam. In S1008, the UE monitors a BFR response.

In a carrier aggregation (CA) scenario, a UE may be configured with multiple cells, including a primary cell (PCell) and secondary cells (SCells). The SCells may include an SCell having an uplink (UL) and an SCell only having a downlink (DL). The UE performs radio resource control (RRC) communication with a base station (gNB) through the PCell.

SUMMARY

A brief summary of embodiments of the present disclosure is given in the following, so as to provide basic understanding on some aspects of the present disclosure. It should be understood that, the summary is not an exhaustive summary of the present disclosure. The summary is neither intended to determine key or important parts of the present disclosure, nor intended to limit the scope of the present disclosure. An object of the summary is to provide some concepts in a simplified form, as preamble of a detailed description later.

According to an embodiment, an electronic device for wireless communication is provided. The electronic device includes processing circuitry. The processing circuitry is configured to perform control to perform carrier aggregation communication with a base station through at least a first cell and a second cell. The processing circuitry is further configured to perform control to transmit first information for beam failure recovery of the second cell to the base station through the first cell.

According to another embodiment, a wireless communication method includes a step of performing carrier aggregation communication with a base station through at least a first cell and a second cell. The method further includes a step of transmitting first information for beam failure recovery of the second cell to the base station through the first cell.

According to another embodiment, an electronic device for wireless communication is provided. The electronic device includes processing circuitry. The processing circuitry is configured to perform control to perform carrier aggregation communication with user equipment through at least a first cell and a second cell. The processing circuitry is further configured to perform control to receive first information for beam failure recovery of the second cell which is transmitted by the user equipment through the first cell.

According to another embodiment, a wireless communication method includes a step of performing carrier aggregation communication with user equipment through at least a first cell and a second cell. The method further includes a step of receiving first information for beam failure recovery of the second cell which is transmitted by the user equipment through the first cell.

According to another embodiment, a computer readable medium is further provided. The computer readable medium includes executable instructions that, when executed by an information processing apparatus, cause the information processing apparatus to execute the above methods.

With the embodiments of the present disclosure, BFR can be effectively performed for different cells in a CA scenario.

BRIEF DESCRIPTION OF THE DRAWINGS

The present disclosure may be understood better with reference to the description given in conjunction with drawings hereinafter. The same or similar reference numerals are used to indicate the same or similar components throughout all the drawings. The drawings together with the following detailed description are included in the specification, form a part of the specification, and are used to further illustrate preferred embodiments of the present disclosure and explain principles and advantages of the present disclosure by examples. In the drawings.

DETAILED DESCRIPTION OF EMBODIMENTS

Figure 1:
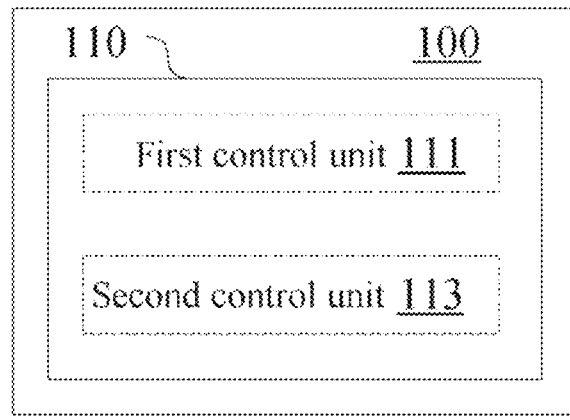
FIG. 1 is a block diagram showing a configuration example of an electronic device for wireless communication according to an embodiment of the present disclosure.

Embodiments of the present disclosure are described below with reference to the drawings. Elements and features described in one of the drawings or one of the embodiments of the present disclosure may be combined with elements and features described in one or more other drawings or embodiments. It should be noted that representations and descriptions of components and processing which are irrelevant to the present disclosure or known by those skilled in the art are omitted in the drawings and the specification for clarity.

Hereinafter, a configuration example of an electronic device for wireless communication according to an embodiment of the present disclosure is explained with reference to FIG. 1. As shown in FIG. 1, an electronic device 100 for wireless communication according to the embodiment includes processing circuitry 110. The processing circuitry 110 may be implemented as, for example, a specific chip, a chipset, or a central processing unit (CPU).

The electronic device according to the embodiment may be implemented at, for example, a user equipment side.

The processing circuitry 110 includes a first control unit 111 and a second control unit 113. It should be noted that, although the first control unit 111 and the second control unit 113 are shown in a form of functional block in the drawings, it should be understood that functions of these units may also be implemented by the processing circuitry as a whole, and are unnecessarily implemented by discrete actual components in the processing circuitry. In addition, although the processing circuitry is shown as one block in the drawings, the electronic device may include multiple processing circuitry. The functions of these units may be distributed to the multiple processing circuitry, so that the multiple processing circuitry cooperate to perform these functions.

The first control unit 111 is configured to perform control to perform carrier aggregation communication with a base station through at least a first cell and a second cell.

The second control unit 113 is configured to perform control to transmit first information for beam failure recovery of the second cell to the base station through the first cell.

According to an embodiment, the first cell may include a primary cell (PCell) or a secondary cell (SCell) having an uplink, and the second cell may include an SCell having no an uplink.

Figure 10:
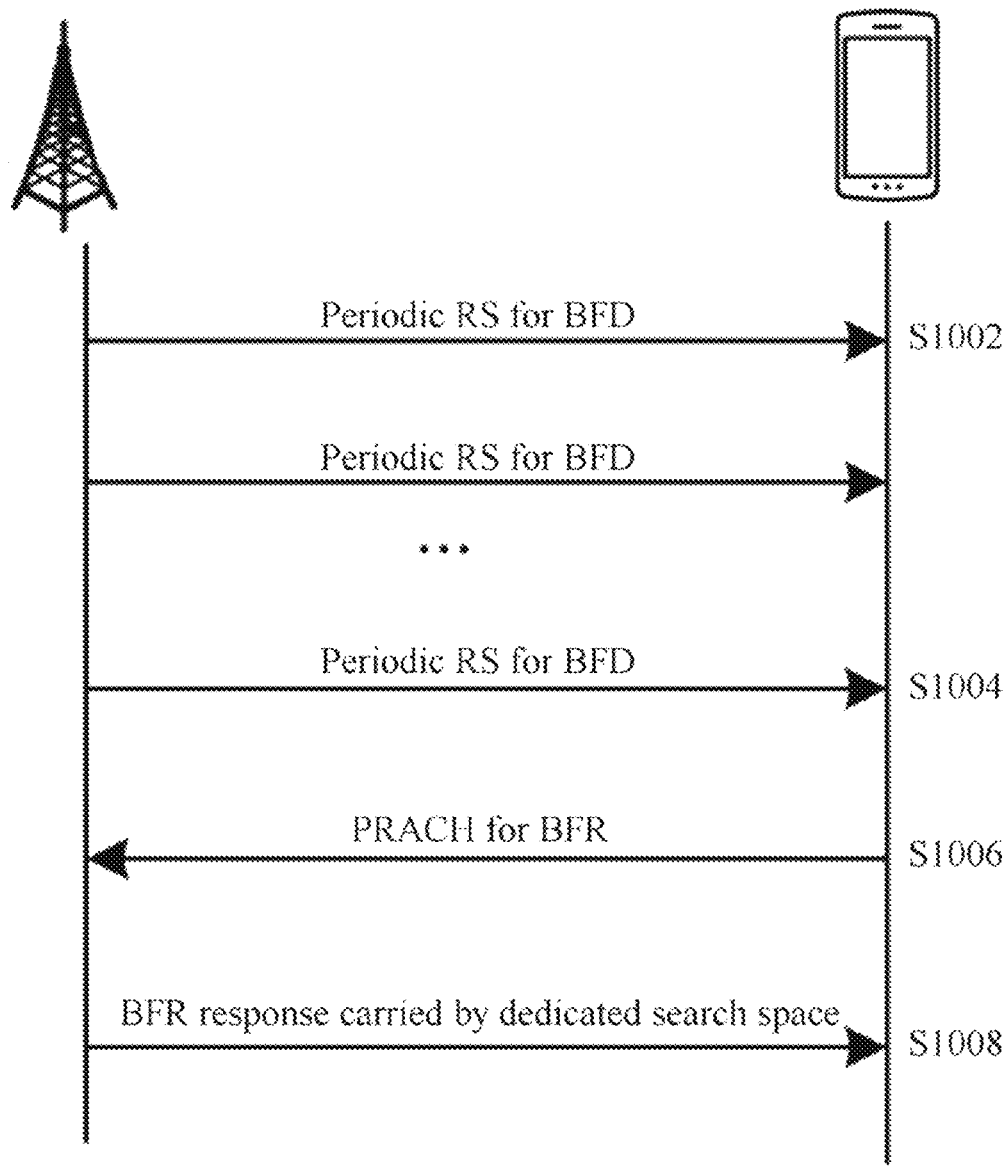
FIG. 10 is a flowchart for explaining a general process of BFR.

As mentioned above, in a carrier aggregation (CA) scenario, a UE may be configured with multiple cells. For example, a UE can be configured with up to 32 cells, including 1 PCell and 31 SCells. However, the conventional BFR process described above with reference to FIG. 10 is applicable to PCells and is not applicable to all SCells; for example, the conventional BFR process is not applicable to the SCells only having a downlink. According to the embodiment, the BFR process may be effectively performed for various cells in the CA scenario.

It should be noted that it is not limited to transmit BFR information for an SCell having no uplink through a PCell or an SCell having an uplink in the embodiment of the present disclosure. For example, considering aspects such as communication quality, resources, and efficiency, BFR information may be transmitted for an SCell having an uplink through a PCell, or BFR information may be transmitted for a PCell through an SCell having an uplink, and so on. That is, the second cell may include a PCell or an SCell having an uplink.

According to an embodiment, the first information may include identification information of the second cell to which a beam failure occurs and identification information of a candidate beam for a beam failure recovery.

As an example, the identification information of the second cell and the identification information of the candidate beam may be transmitted through a physical uplink control channel (PUCCH).

In this case, according to an embodiment, the PUCCH may include an indicator bit for indicating that the PUCCH includes BFR information.

In addition, for a cell having an uplink, such as a PCell or an SCell having an uplink, the cell may transmit BFR information to the base station through the cell itself in a case that a beam failure occurs to the cell.

Accordingly, according to an embodiment, the second control unit 113 may be configured to perform control to transmit second information for beam failure recovery of the first cell to the base station through the first cell.

In this case, BFR information of the first cell is transmitted through the first cell, and thus the BFR information may only include identification information of a candidate beam.

As an example, the second information may be transmitted through a physical random access channel (PRACH).

Figure 11:
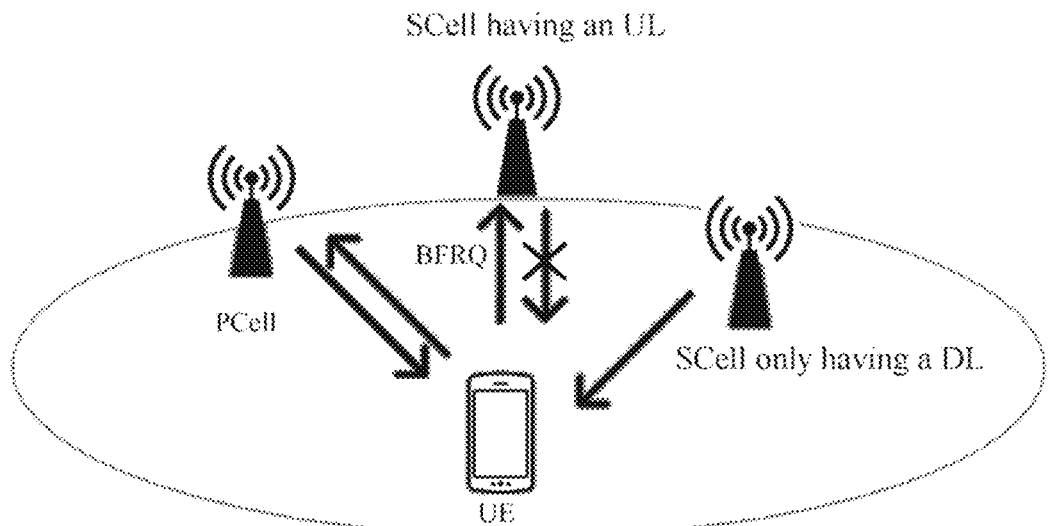
FIG. 11 is a schematic diagram showing an exemplary scenario of BFR.
Figure 12:
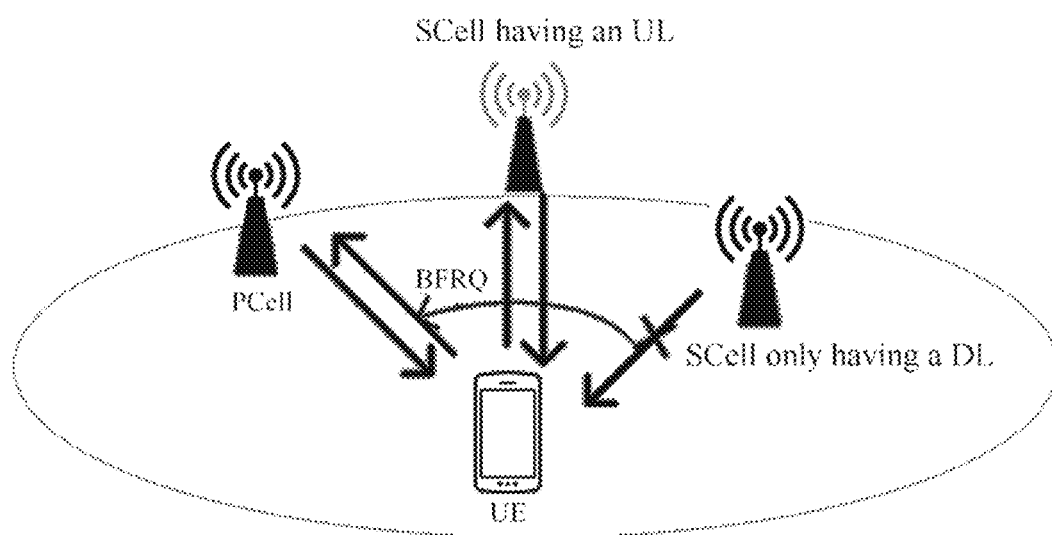
FIG. 12 is a schematic diagram showing an exemplary scenario of BFR.
Figure 13:
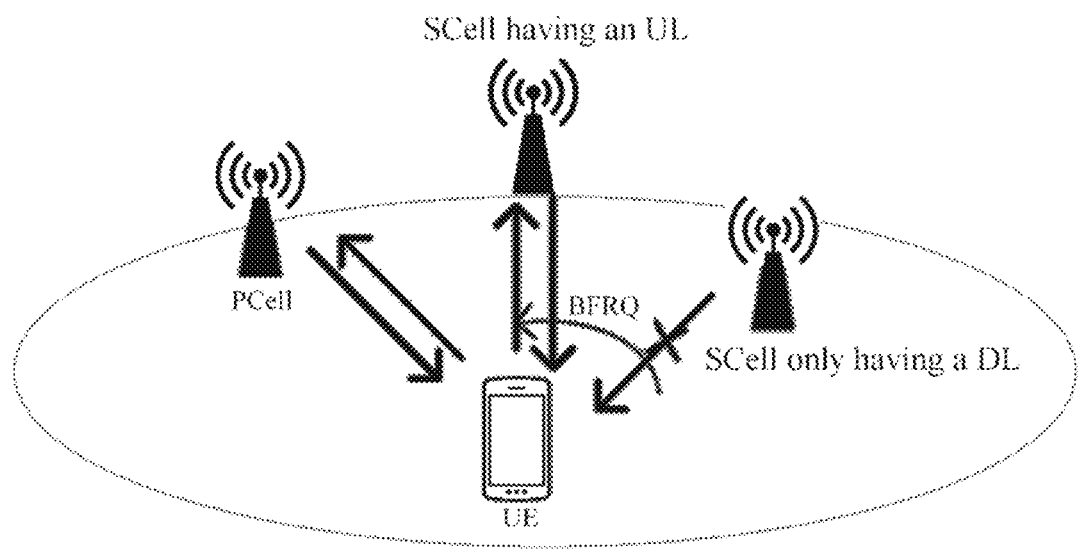
FIG. 13 is a schematic diagram showing an exemplary scenario of BFR.

Next, referring to FIGS. 11 to 13, examples of transmitting a beam failure recovery request (BFRQ) in different exemplary scenarios are described.

FIG. 11 shows an exemplary scenario where a beam failure occurs to an SCell having an uplink. In this scenario, a BFRQ may be transmitted to a base station (sucha as a gNB) through the SCell. In this scenario, the BFRQ may be transmitted through a PRACH or a PUCCH.

FIGS. 12 and 13 each show an exemplary scenario where a beam failure occurs to an SCell only having a downlink. In this scenario, a BFRQ may be transmitted to a base station through a PCell (as shown in FIG. 12) or an SCell having an uplink (as shown in FIG. 13). In this scenario, since it is required to transmit identification information of the cell to which beam failure occurs to the base station, the BFRQ is preferably transmitted through a PUCCH.

In particular, in a case that a BFRQ of a call is transmitted through an uplink of the cell, the BFRQ may be transmitted through a PRACH, and the BFRQ may include identification information of a candidate beam and does not include identification information of the cell to which a beam failure occurs. In a case that a BFRQ of a cell is transmitted through another cell, since the BFRQ needs to including identification information of the cell to which a beam failure occurs, the PRACH may be not sufficient to carry the information, and thus the BFRQ may be transmitted through a PUCCH.

In addition, since a UE may be configured with multiple types of cells, such as a PCell (which may perform RRC communicate with the base station), an SCell having an uplink, and an SCell only having a downlink, according to an embodiment, the cells configured for the UE may be grouped, and the BFR process may be performed based on the grouping.

Hereinafter, a configuration example of an electronic device for wireless communication according to another embodiment is explained with reference to FIG. 2.

Figure 2:
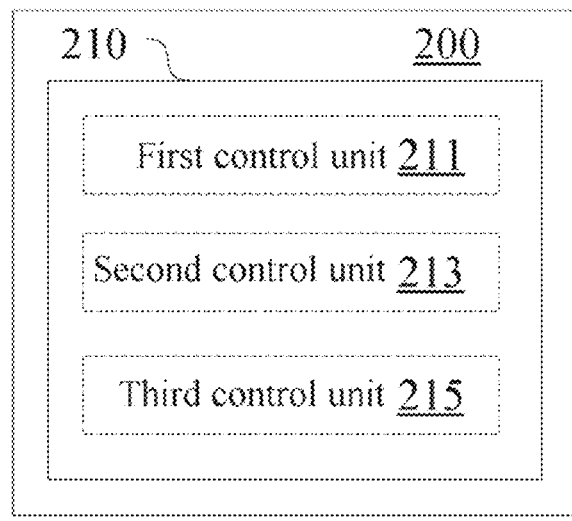
FIG. 2 is a block diagram showing a configuration example of an electronic device for wireless communication according to another embodiment of the present disclosure.

As shown in FIG. 2, an electronic device 200 according to the embodiment includes processing circuitry 210. The processing circuitry 210 includes a first control unit 211, a second control unit 213 and a third control unit 215. Functional configurations of the first control unit 211 and the second control unit 213 are similar to the functional configurations of the first control unit 111 and the second control unit 113 described above with reference to FIG. 1, respectively.

The third control unit 215 is configured to perform control to receive grouping information. The grouping information indicates multiple cell subsets of a cell set for the carrier aggregation communication, each of the cell subsets containing at least one first cell.

The grouping information may be determined by the base station and transmitted to the UE, for example, through RRC control signaling. According to an embodiment, the third control unit 215 may be configured to perform control to receive grouping information from the base station through RRC signaling.

Figure 14:
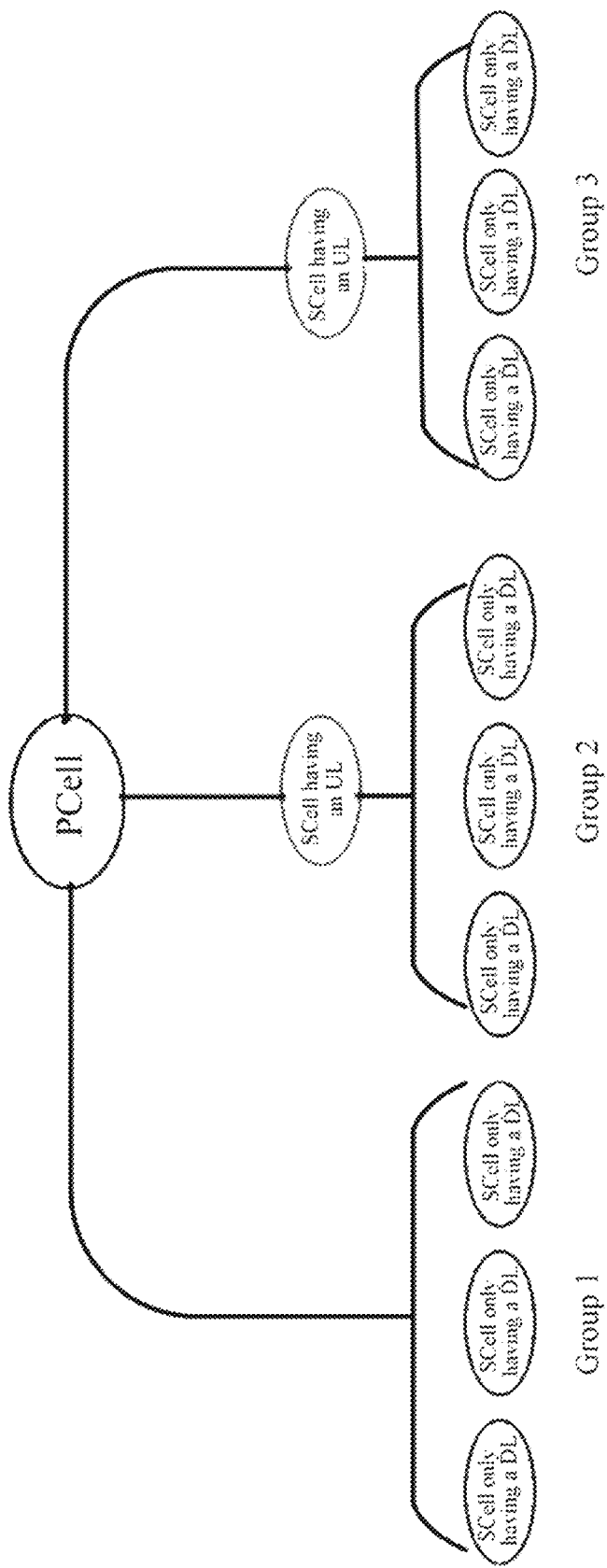
FIG. 14 is a schematic diagram for explaining an example of grouping cells.

As an example, FIG. 14 shows an example of grouping all cells configured for a UE. In the example, all cells configured for a UE are divided into three groups base on the total number of PCells and SCells having an uplink. Each of the groups includes one PCell or SCell having an uplink, and includes several SCells only having a downlink. Specifically, in the example shown in FIG. 14, group 1 includes a PCell and three SCells having only a downlink, and group 2 and group 3 each include one SCell having an uplink and three SCells only having a downlink.

Cell grouping may be determined based on different rules. For example, co-located cells may be grouped into a same cell subset.

Figure 15:
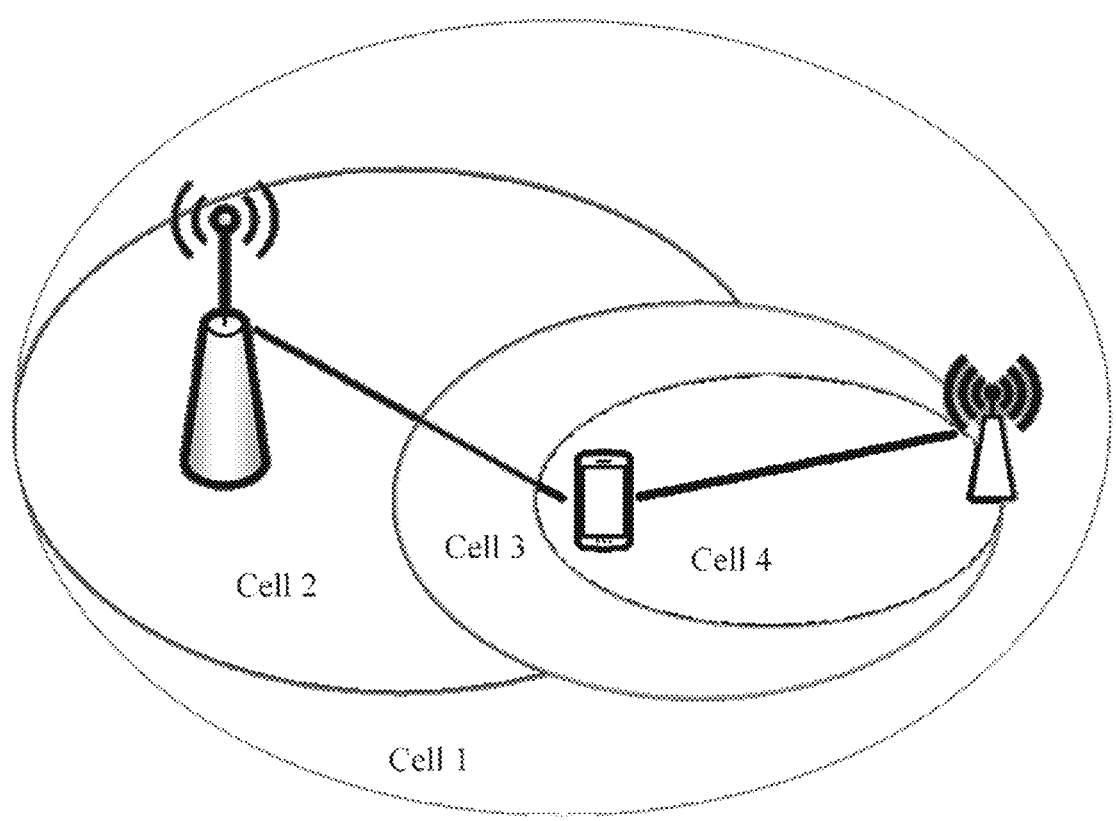
FIG. 15 is a schematic diagram showing an example of multiple cells.

As an example, as shown in FIG. 15, a UE is connected to 4 cells, where cell 1 and cell 2 are co-located cells, and cell 3 and cell 4 are co-located cells. It is assumed that cell 1 and cell 3 are SCells having an uplink and cell 2 and cell 4 are SCells only having a downlink, then cell 1 and cell 2 may be grouped into one group and cell 3 and cell 4 may be grouped into one group based on the above rule.

Co-located cells are grouped into a group, for example, facilitating saving communication overhead between base stations.

However, the rule for grouping cell is not limited to the above. For example, cells having large differences in locations may be preferentially grouped into a same cell subset. Still taking the scenario shown in FIG. 15 as an example, cell 1 and cell 4 may be grouped into one group and cell 3 and cell 2 may be grouped into one group based on the rule in this example. Cells in different locations are grouped into a same group, for example, facilitating reducing the possibility of beam failures occurring to multiple cells in a group simultaneously.

Once obtaining the grouping information, when the UE detects a beam failure, in a case that the beam failure occurs to a PCell or an SCell having an uplink, the UE may transmit a BFRQ through the PCell or the SCell having an uplink; and in a case that the beam failure occurs to an SCell only having a downlink, the UE may determine a group including a cell to which the beam failure occurs and perform a BFR process based on cell grouping, for example, the UE may transmit a BFRQ through a PCell or an SCell having an uplink which is included in the same group as the cell.

Figure 16:
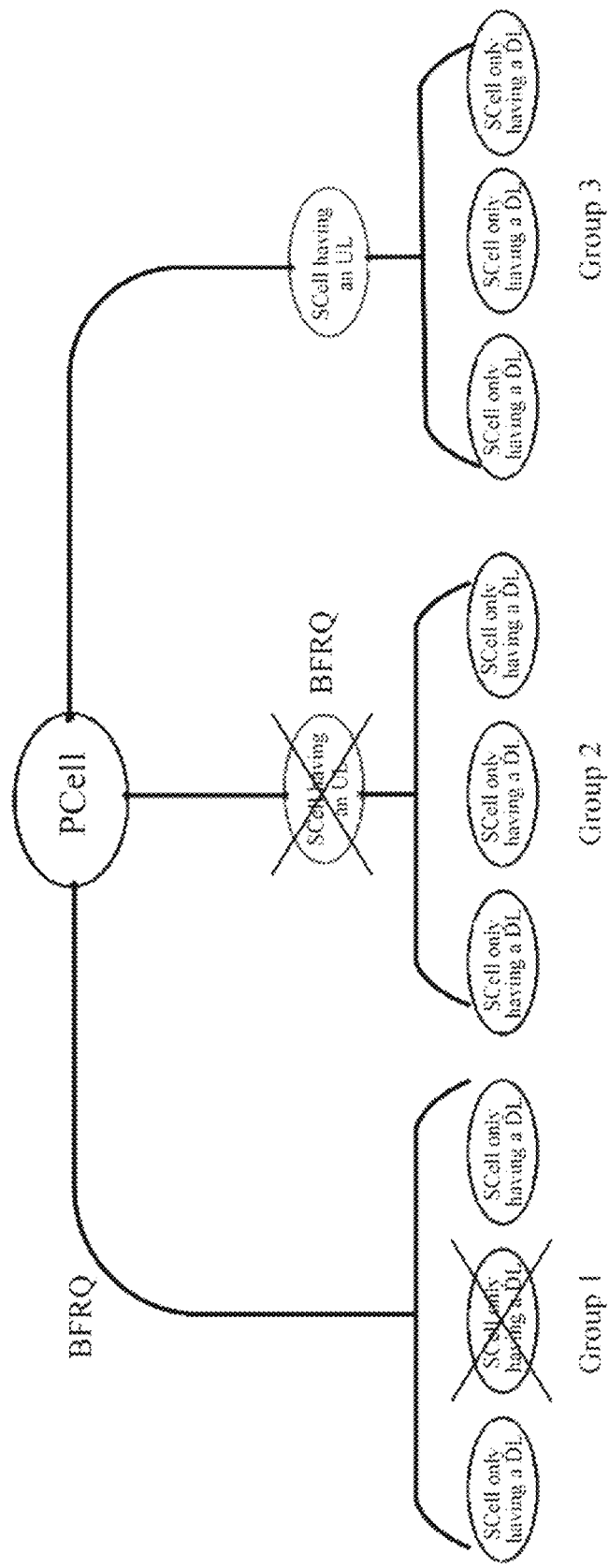
FIG. 16 is a schematic diagram for explaining an example of BFR of grouped cells.

As shown in FIG. 16, in a case that a beam failure occurs to an SCell only having a downlink in group 1, a BFRQ may be transmitted through a PCell in group 1; and in a case that a beam failure occurs to an SCell having a uplink in group 2, a BFRQ may be transmitted through the SCell.

Figure 22:
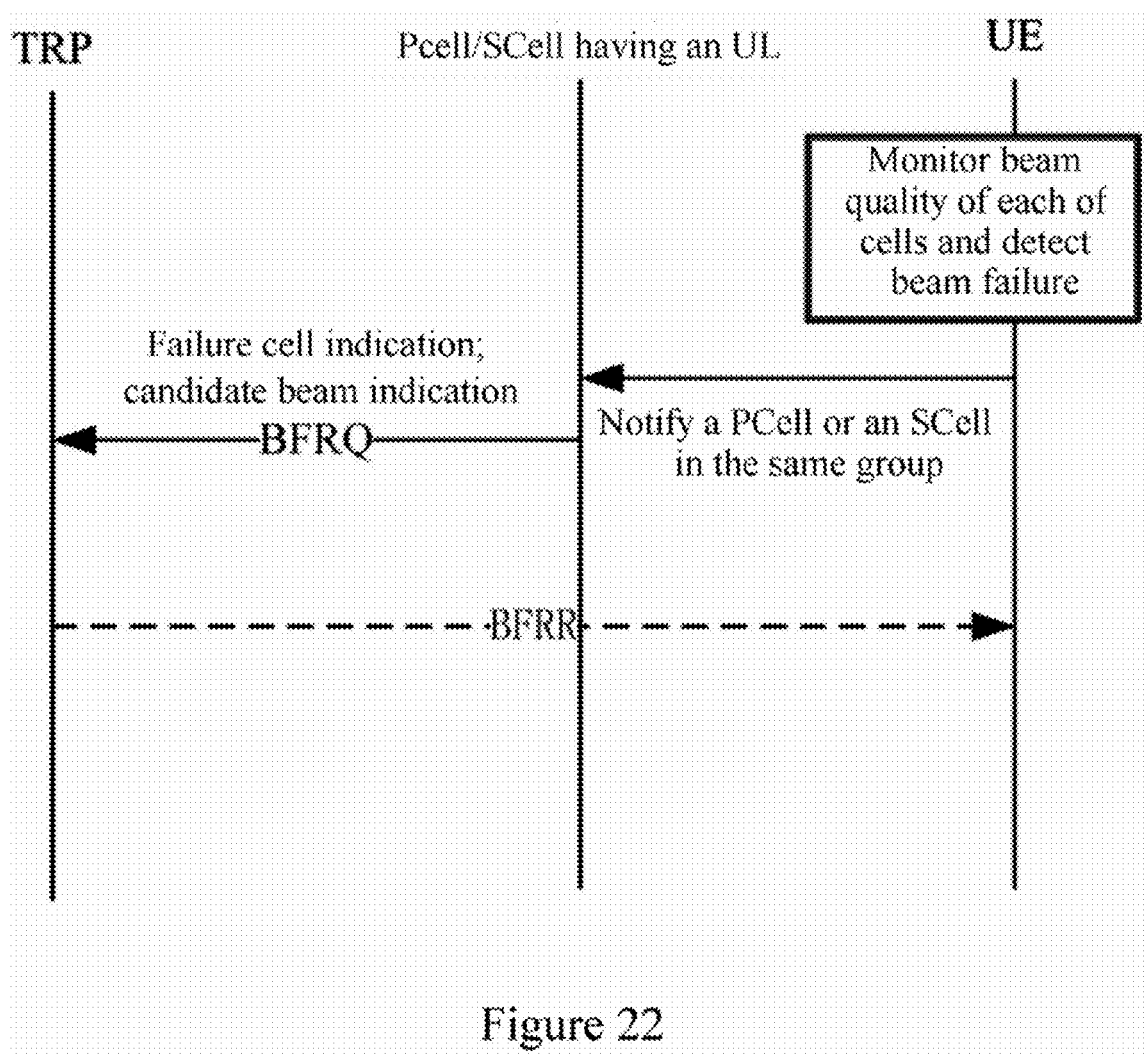
FIG. 22 is a signaling flowchart showing a process example of BFR.

FIG. 22 shows an exemplary process of BFR. First, UE performs beam failure detection. In a case of detecting a beam failure, the UE notifies beam failure information to a PCell or an SCell having an uplink. Then, the PCell or the SCell having an uplink that received the notification transmit a BFRQ to a base station (for example, a transmit and receive port TRP), where the BFRQ includes a failure cell indication and a candidate beam indication.

In the case of performing BFR based on cell grouping, since the cell that transmits the BFRQ may not be the cell to which the beam failure occurs, it is required to indicate the cell to which the beam failure occurs in the BFRQ.

According to an embodiment, the third control unit 215 may be configured to perform control to receive information of a corresponding relationship between a cell and a cell identifier. The corresponding relationship may include a corresponding relationship between a physical cell identifier and a defined global identifier, where the global identifier is used to identify a cell in the cell set. Alternatively, the corresponding relationship may include a corresponding relationship between a physical cell identifier and defined group and local identifiers, where the group identifier is used to identify a cell subset, and the local identifier is used to identify a cell in a cell subset.

Accordingly, the first information transmitted to the base station may include a global identifier of the second cell. Alternatively, the first information transmitted to the base station may include a local identifier of the second cell in a cell subset including the second cell. The base station may determine the second cell based on the first cell through which the first information is transmitted and the local identifier.

Manners of indicating a cell to which a beam failure occurs are further explained below in conjunction with examples.

First, an example of an indication manner with a global identifier is explained.

As mentioned above, a UE may be configured with up to 32 cells, including a PCell and 31 SCells. Therefore, each of the cells may be configured with a global ID having 5 bits, as shown in the following Table 1.

TABLE 1

| Bits | IDs of cells having a beam failure |
|---|---|
| 00000 | PCell 0 |
| 00001 | SCell 1 |
| 00010 | SCell 2 |
| . . . | . . . |
| 11111 | SCell 31 |

When a cell joins a connection, a physical cell identifier (PCI) of the cell may be obtained by RRC configuration physCellId. Correspondingly, for example, a RRC parameter globalCellId may be introduced to indicate the cell configured for the UE, and a corresponding relationship between the PCI and the global ID may be established.

More specifically, PCIs may be sorted from small to large, and then each of the cells is assigned a global ID. For example, in a case that a UE establishes a connection through three cells, parameters physCellId of which are 23, 47, and 59, respectively, then the three cells may be assigned parameters globalCellId through RRC, as shown in Table 2.

TABLE 2

| physCellId | globalCellId |
|---|---|
| 23 | 0 |
| 47 | 1 |
| 59 | 2 |

Then, an example of an indication manner with a local identifier is explained.

In a case that all cells of a UE are grouped into k groups, each of the cells in a group may be assigned a local ID, as shown in Table 3.

TABLE 3

| Group ID | Cell ID |
|---|---|
| 0 | 0, 1, 2 . . . |
| 1 | 0, 1, 2 . . . |
| . . . | . . . |
| k | 0, 1, 2 . . . |

In each of the groups, a local ID of a cell having an uplink may be 0, and local IDs of other cells may be 1, 2, . . . .

A group ID and a local ID of a cell may be, for example, configured by the base station using RRC parameters. RRC signaling contains a parameter cellGroupId, which is used to indicate whether a cell is included a primary cell group or a secondary cell group. A new RRC parameter GroupID may be defined to indicate group IDs of all the cells connecting to the UE, and the local ID may be configured by using a parameter LocalID.

In the transmission of BFRQ based on grouping, a group ID and a local ID are transmitted for accurately indicating each cell.

Figure 17:
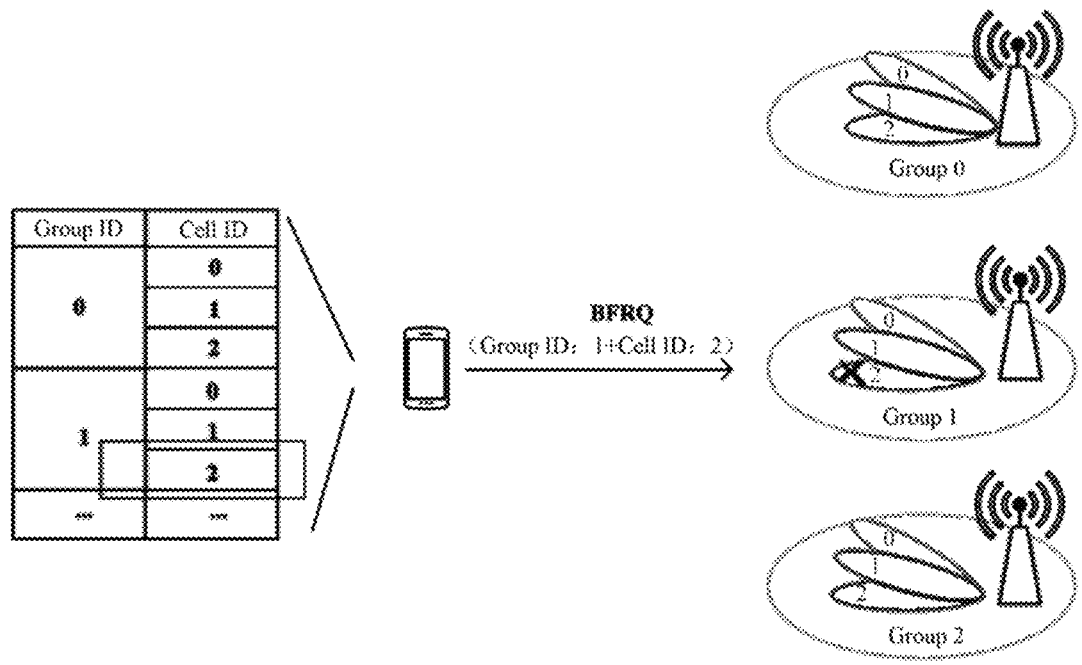
FIG. 17 is a schematic diagram for explaining an example of a manner of indicating a cell.

As shown in FIG. 17, the number of cell groups k is 3, the number of SCells only having a downlink is 6, and the number of cells in each of the groups is 3. In a case that a cell having a group ID of 1 (01 represented in binary) and a local ID of 2 (10 represented in binary) has a beam failure, a BFRQ is transmitted through a cell having a group ID of 1 and a local ID of 0. The ID of the cell having a beam failure may be expressed as a combination of a group ID and a local ID represented in binary, that is, 0110.

Then, another example of an indication manner with a local identifier is explained.

Figure 18:
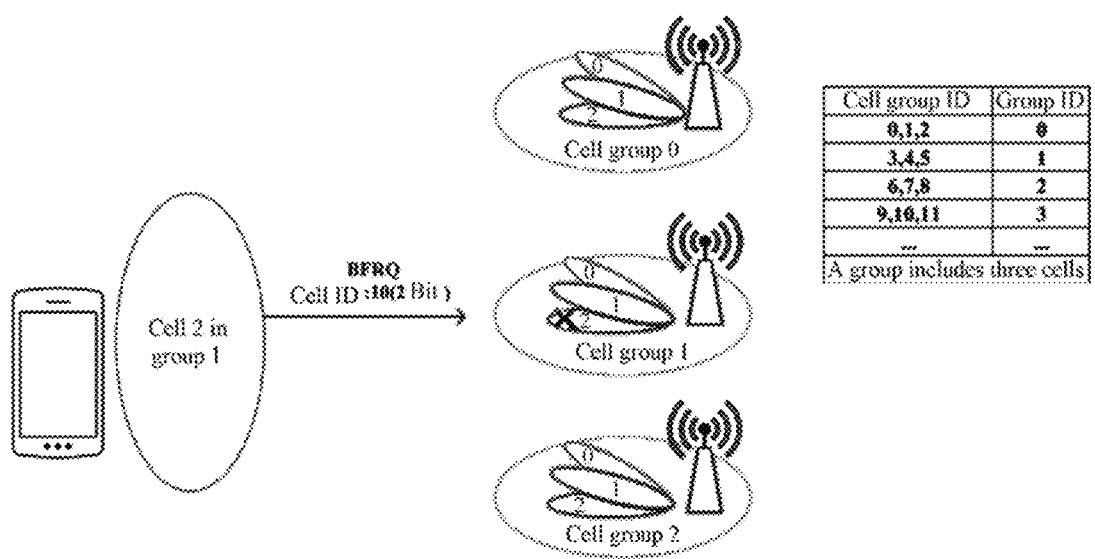
FIG. 18 is a schematic diagram for explaining an example of a manner of indicating a cell.

In a case that a BFRQ of a cell having a beam failure is transmitted through a cell having an uplink, and the cell having a beam failure and the cell having an uplink are included in a same group, the base station may determine the group ID of the cell having a beam failure based on the cell through which the BFRQ is transmitted. For example, the base station may store the group IDs of all the cells having a uplink, as shown in FIG. 18. In this case, the BFRQ transmitted to the base station may not include the group ID and only include the local ID of the cell having a beam failure.

As shown in FIG. 18, the cell having a beam failure and the cell through which the BFRQ is transmitted are included in the same group, and it is only required for the UE to transmit the local ID of the cell having a beam failure in the BFRQ without transmitting the group ID.

The manners of indicating identification information of a cell to which a beam failure occurs are described above. Hereinafter, manners of indicating identification information of a candidate beam for a beam failure recovery are explained.

According to an embodiment, the identification information of the candidate beam includes a local identifier of the candidate beam in the second cell. The base station may determine the candidate beam based on the second cell and the local identifier.

The ID of the candidate beam may correspond to a PRACH sequence one to one, and the candidate beam may be indicated through a PRACH. However, in a case that the number of cells configured for a UE is large, the number of candidate beams is correspondingly large, and thus the required PRACH resources are large. For example, if the number of the PRACH resources is equal to the number of candidate beams, each of the cells is required to be configured with up to 64 PRACH resources, and it is required to configure a total of 320 PRACH resources. Therefore, candidate beam information may be preferably transmitted through a PUCCH.

The PUCCH carries control information such as a channel state indicator (CSI), a hybrid automatic repeat request (HARQ), and a scheduling request (SR). In a case that a BFRQ is transmitted through a PUCCH, a beam failure indicator may be included in the PUCCH, so that the base station may determine that the information to be received is a BFRQ instead of other control information mentioned above.

As an example, an all-zero sequence of N symbols may be used as a beam failure indicator. Since the length of the symbol of the PUCCH format ranging from 1 to 2 or from 4 to 14, in order to distinguish from these formats and ensure that the beam failure indicator is not too long, for example, N may be set to 3.

After transmitting the beam failure indicator, the UE may transmit the ID of the cell having a beam failure and the ID of the candidate beam to the base station. For the indication of the ID of the cell having a beam failure, one may refer to the above exemplary embodiments.

Exemplary manners of transmitting an ID of a candidate beam through PUCCH are explained below.

In an example, a corresponding relationship between PUCCH resources and IDs of candidate beams may be established in the following manner. Assuming that a UE is configured with n cells, 64×n PUCCH resources are required for mapping with the IDs of the candidate beams. Assuming that n is equal to 4, 256 PUCCH resources are required, and an 8-bit number represented in binary may be used to indicate the IDs of the candidate beams, as shown in Table 4.

TABLE 4

| PUCCH bits | IDs of candidate beams |
|---|---|
| 00000000 | 0 |
| 00000001 | 1 |
| 00000010 | 2 |
| ... | ... |
| 11111111 | 255 |

In another example, a corresponding relationship between PUCCH resources and IDs of candidate beams may be established in a group-based manner. The group mentioned here refers to a cell, that is, the beams for a cell are grouped into a group. In this manner, a PUCCH sequence no longer corresponds to a candidate beam, but corresponds to a beam set.

For example, assuming that a UE is configured with k cell groups and each of the cells may be configured with up to 64 beams, k candidate beams having the same local ID may be regarded as a candidate beam set, and a PUCCH sequence may corresponds to the candidate beam set. That is, each of PUCCH sequences corresponds to a group of candidate beams, and the beams in the group have a same local ID in the respective cells.

As an example, Table 5 shows a scenario where two cells to which the UE is connected are respectively configured with three candidate beams, and each of the candidate beams has a local ID in a respective cell.

TABLE 5

| Cell ID | Local IDs of candidate beams |
|---|---|
| 1 | 0 |
|  | 1 |
|  | 2 |
| 2 | 0 |
|  | 1 |
|  | 2 |

In this case, candidate beams having the same local ID may correspond to the same PUCCH sequence, as shown in Table 6.

TABLE 6

| PUCCH bits | Candidate beam list |
|---|---|
| 000000 | {0, 0} |
| 000001 | {1, 1} |
| 000010 | {2, 2} |

In the example shown in Table 6, each of the PUCCH sequences corresponds to a group of candidate beams having the same local ID, and the order of the candidate beams in the group may be, for example, based on the IDs of corresponding cells.

Figure 19:
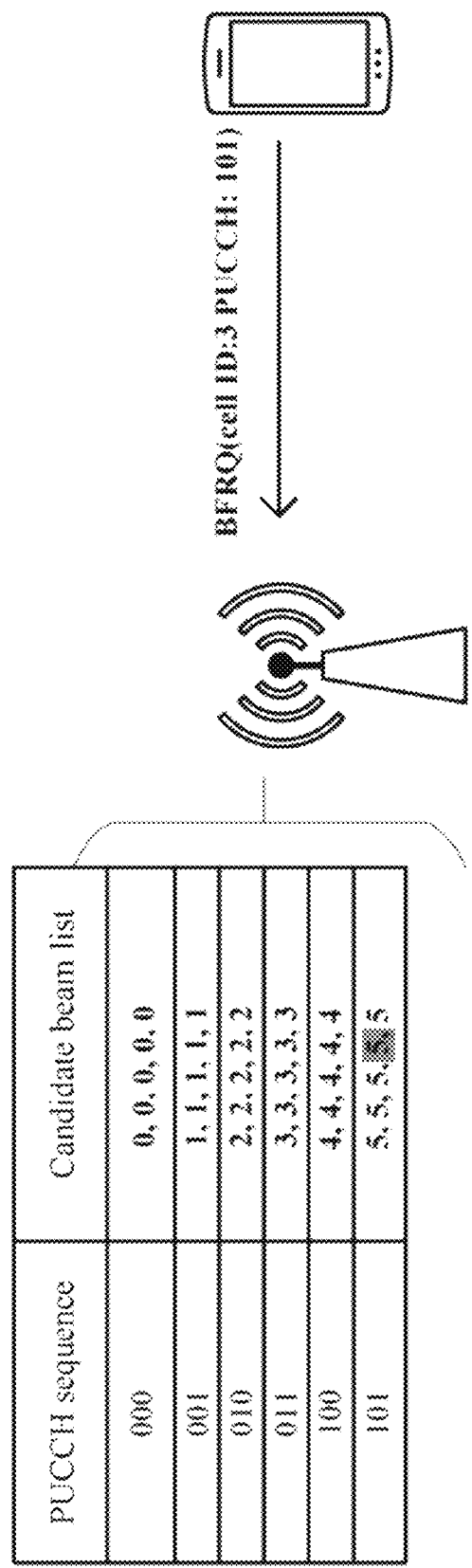
FIG. 19 is a schematic diagram for explaining an example of a manner for indicating a candidate beam.

Different PUCCH sequences correspond to different candidate beam sets, and a candidate beam may be determined further based on indication information of a cell ID (manners of indicating a cell ID have been explained in the above exemplary embodiments). For example, in the example shown in FIG. 19, in a case that the PUCCH sequence is 101 and the cell ID is 3, it may be determined that the candidate beam is a beam having a local ID of the cell having an ID of 3.

In the above example, in transmitting BFRQ through PUCCH, for example, a beam failure indication may be transmitted through SR, an ID of a failure beam may be transmitted through the defined PUCCH format, and the ID of the candidate beam may be transmitted through the defined PUCCH format.

In addition, in a case that the base station knows the ID of the call having a failure beam, it is only required for the UE to report the PUCCH sequence to indicate the local ID of the candidate beam (which may be regarded as the ID of the candidate beam set). Accordingly, the number of bits required in PUCCH may be reduced.

As mentioned above, a UE can be configured with multiple cells, and thus beam failures may occur to multiple cells simultaneously. Examples of BFR in this case are explained below.

According to an embodiment, in a case that beam failures occur to both the primary cell and the secondary cell, a beam failure recovery request of the primary cell may be made preferentially; and in a case that beam failures occur to both the secondary cell having an uplink and the secondary cell having no uplink, a beam failure recovery request of the secondary cell having an uplink may be made preferentially. Since the RRC connection is performed through the primary cell, the primary cell may be assigned a high priority in the BFR process. For the secondary cells, uplink control signaling may be transmitted through the secondary cell having an uplink, the secondary cell having an uplink being important for the UE, and thus the secondary cell having an uplink may be assigned a high priority.

In addition, in a case that the cells have been grouped according to the above embodiments, in a case that beam failures occur to two or more cell subsets, beam failure recovery requests may be simultaneously made through respective first cells (such as a primary cell or a secondary cell having an uplink) in the two or more cell subsets.

More specifically, in the beam failure recovery process based on cell grouping, two exemplary cases may be considered. In a first case, at most one beam failure occurs in each group. In a second case, more than one beam failure occurs in at least one group. Examples of BFR in the two exemplary cases are respectively explained below.

In the case that at most one beam failure occurs in each group, since the processes of beam failure detection and new beam indication may be respectively performed in the groups, BFRQs may be simultaneously transmitted through primary cells or secondary cells each having an uplink in the respective groups.

Figure 20:
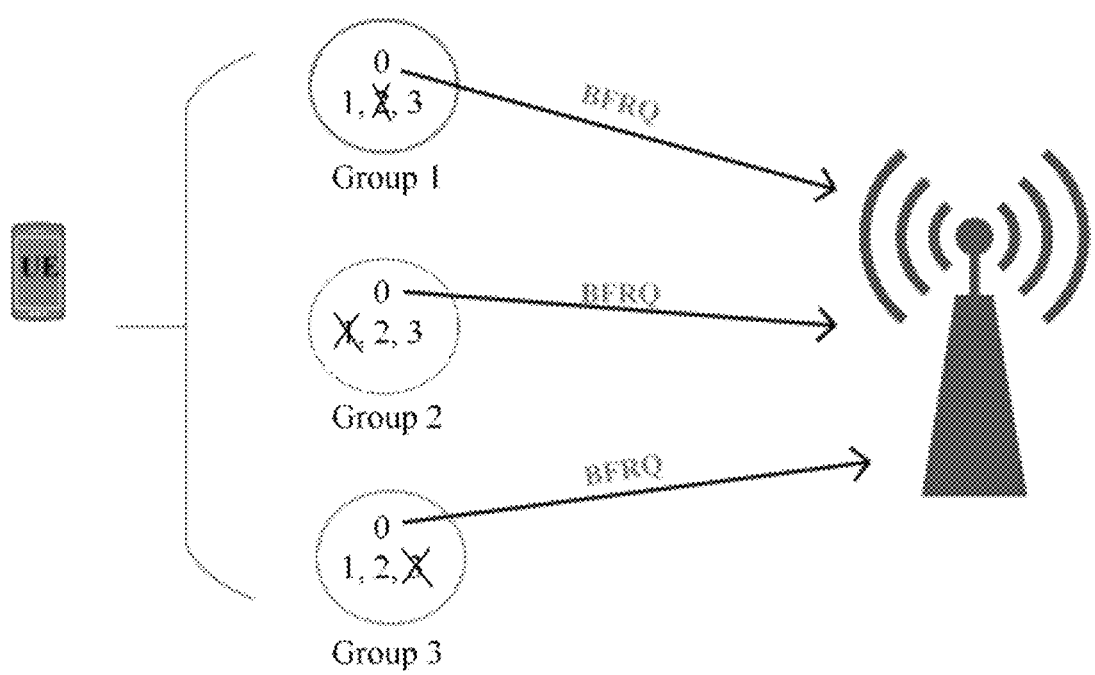
FIG. 20 is a schematic diagram for explaining an example of BFR of multiple cells.

As shown in FIG. 20, in a case that beam failures simultaneously occur to cell 2 in group 1, cell 1 in group 2 and cell 3 in group 3, BFRQs may be transmitted to the base station simultaneously through cell 0 in group 1, cell 0 in group 2, and cell 0 in group 3.

When multiple BFRQs are transmitted simultaneously, according to the above embodiments, for example, a failure cell indication and a candidate beam indication may be provide through a PUCCH. Even if a same PUCCH sequence is transmitted through two cells, the base station may distinguish the candidate beams reported by the two cells since the IDs of the cells having a beam failure are indicated. It should be noted that, in the case that the same PUCCH sequence is selected for the two cells, the UE should not ignore any of the two cells and should transmit the PUCCH sequence through each of the two cells, so that the base station may obtain corresponding information.

In the case that more than one beam failure occurs in at least one group, BFRQs may be simultaneously transmitted through primary cell or secondary cells each having an uplink in the respective groups, and for each of the groups, only one BFRQ is transmitted at a time. For a group in which more than one beam failure occurs, a BFRQ of a secondary cell having an uplink may be transmitted preferentially (for example, through a primary cell).

Figure 21:
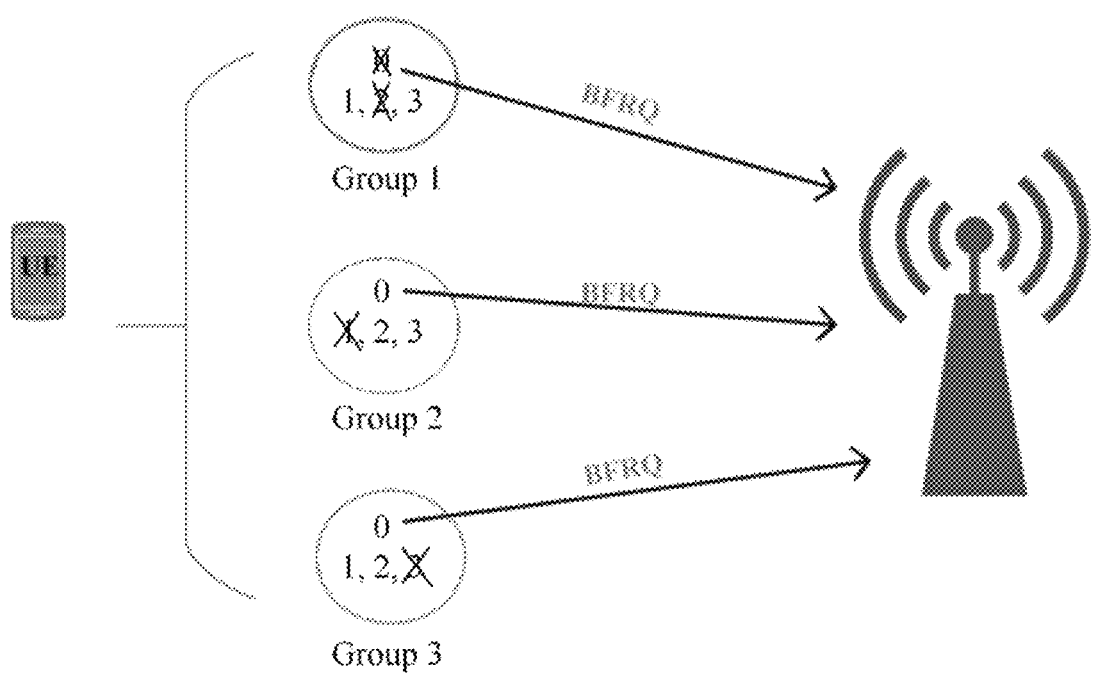
FIG. 21 is a schematic diagram for explaining an example of BFR of multiple cells.

As shown in FIG. 21, in a case that beam failures simultaneously occur to cell 0 and cell 2 in group 1, cell 1 in group 2 and cell 3 in group 3, BFRQs of cell 0 in group 1, cell 1 in group 2, and cell 3 in group 3 may be simultaneously transmitted to the base station, and then a BFRQ of cell 2 in group 1 may be transmitted.

In the above description of the electronic device for wireless communication according to the embodiments of the present disclosure, it is apparent that some processes and methods are also disclosed. Next, a wireless communication method according to the embodiments of the present disclosure is described without repeating details described above.

Figure 3:
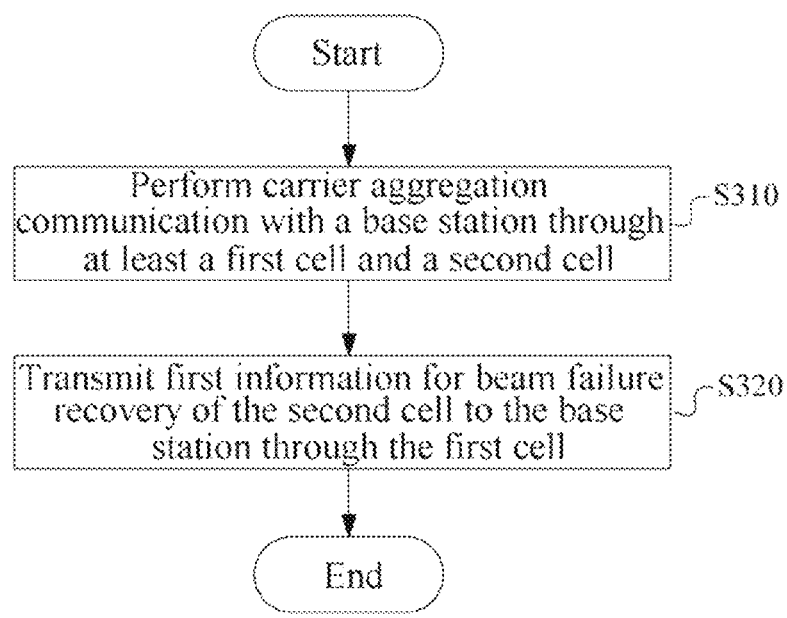
FIG. 3 is a flowchart showing a process example of a wireless communication method according to an embodiment of the present disclosure.

As shown in FIG. 3, a wireless communication method according to an embodiment includes a step S310 of performing carrier aggregation communication with a base station through at least a first cell and a second cell and a step S320 of transmitting first information for beam failure recovery of the second cell to the base station through the first cell.

The embodiments of the device and method implemented at a user equipment side are described above. In addition, the embodiments implemented at a base station side are included in the present disclosure. Next, embodiments of a device and method implemented at a base station side are described without repeating details of the embodiments described above.

Figure 4:
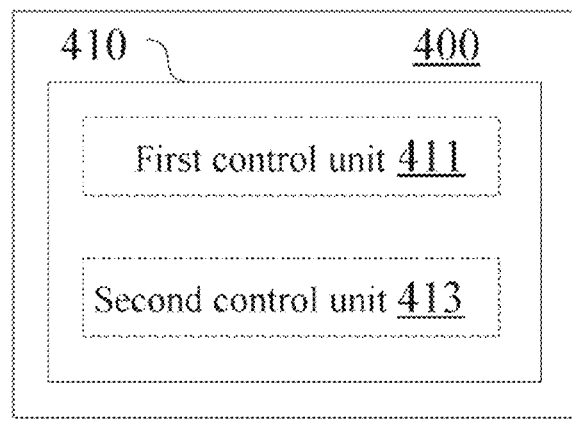
FIG. 4 is a block diagram showing a configuration example of an electronic device for wireless communication according to an embodiment of the present disclosure.

As shown in FIG. 4, an electronic device 400 for wireless communication according to an embodiment includes processing circuitry 410. The processing circuitry 410 includes a first control unit 411 and a second control unit 413.

The first control unit 411 is configured to perform control to perform carrier aggregation communication with user equipment through at least a first cell and a second cell.

The second control unit 413 is configured to perform control to receive first information for beam failure recovery of the second cell which is transmitted by the user equipment through the first cell.

The first cell may include a primary cell or a secondary cell having an uplink, and the second cell may include a secondary cell having no uplink.

The first information may include identification information of the second cell to which a beam failure occurs and identification information of a candidate beam for a beam failure recovery.

The second control unit 413 may be configured to perform control to receive the identification information of the second cell and the identification information of the candidate beam through a PUCCH.

The second control unit 413 may be further configured to perform control to receive second information for beam failure recovery of the first cell from the user equipment through the first cell. The second information may include identification information of a candidate beam, and the second control unit 413 may be configured to perform control to receive the second information through a PRACH.

According to an embodiment, the identification information of the candidate beam may include a local identifier of the candidate beam in the second cell. The processing circuitry 410 may be configured to determine the candidate beam based on the second cell and the local identifier.

Figure 5:
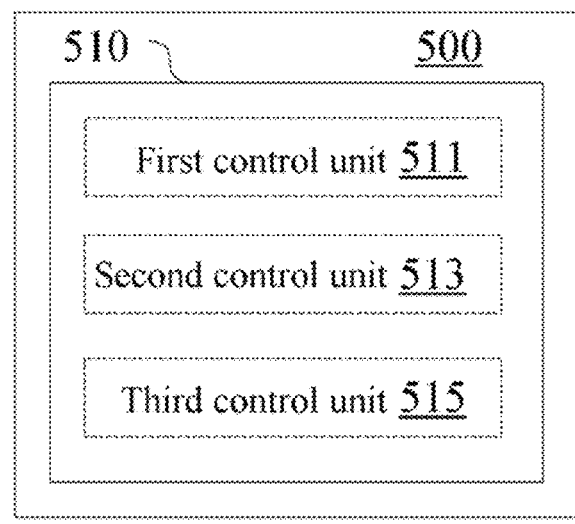
FIG. 5 is a block diagram showing a configuration example of an electronic device for wireless communication according to another embodiment of the present disclosure.

FIG. 5 shows a configuration example of an electronic device for wireless communication according to another embodiment. An electronic device 500 includes processing circuitry 510. The processing circuitry 510 includes a first control unit 511, a second control unit 513, and a third control unit 515. The first control unit 511 and the second control unit 513 are similar to the first control unit 411 and the second control unit 413 described in the above embodiment.

The third control unit 515 is configured to determine grouping information and perform control to transmit the determined grouping information to the user equipment. The grouping information indicates multiple cell subsets of a cell set for the carrier aggregation communication, and each of the cell subsets contains at least one first cell.

The third control unit 515 may be further configured to determine a corresponding relationship between a cell and a cell identifier and perform control to transmit information of the corresponding relationship to the user equipment. The corresponding relationship includes: a corresponding relationship between a physical cell identifier and a defined global identifier or a corresponding relationship between a physical cell identifier and defined group and local identifiers. The global identifier is used to identify a cell in the cell set, the group identifier is used to identify a cell subset, and the local identifier is used to identify a cell in a cell subset.

According to an embodiment, the first information received from the user equipment may include a global identifier of the second cell or a local identifier of the second cell in a cell subset including the second cell. The third control unit 515 may be configured to determine the second cell based on the global identifier or determine the second cell based on the first cell and the local identifier.

The third control unit 515 may be further configured to perform control to transmit the grouping information to the user equipment through radio resource control signaling.

Figure 6:
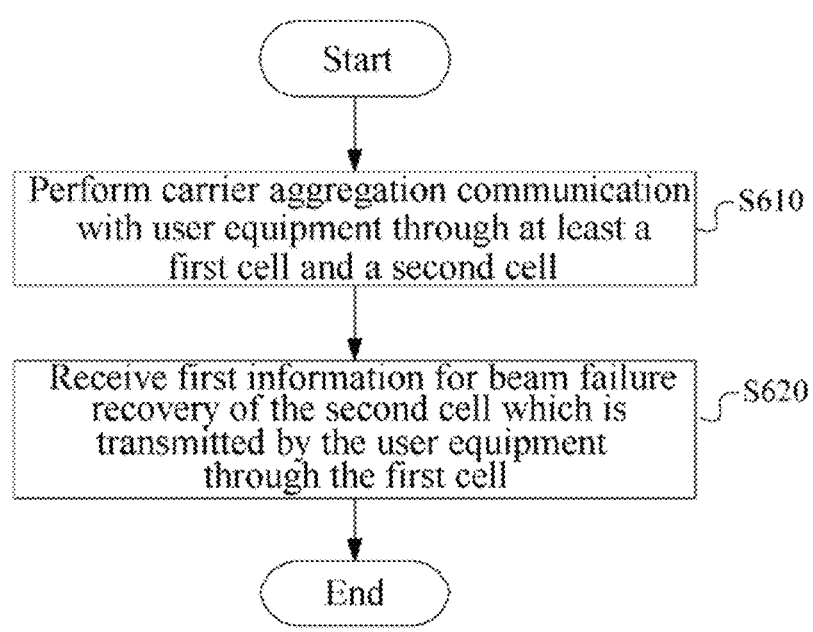
FIG. 6 is a flowchart showing a process example of a wireless communication method according to an embodiment of the present disclosure.

FIG. 6 shows a wireless communication method according to an embodiment.

In S610, carrier aggregation communication is performed with user equipment through at least a first cell and a second cell.

In S620, first information for beam failure recovery of the second cell which is transmitted by the user equipment through the first cell is received.

A computer readable medium is further provided according to an embodiment of the present disclosure. The computer readable medium includes executable instructions that, when executed by an information processing apparatus, cause the information processing apparatus to execute the methods according to the above embodiments.

For example, steps of the above methods and modules and/or units of the above devices may be implemented as software, firmware, hardware, or a combination thereof. In a case that steps of the above methods and modules and/or units of the above devices are implemented by software or firmware, a computer (for example, a general-purpose computer 1400 shown in FIG. 7) having a dedicated hardware structure may be installed with a program constituting software for implementing the above methods from a storage medium or a network. When being installed with various programs, the computer is capable of performing various functions.

Figure 7:
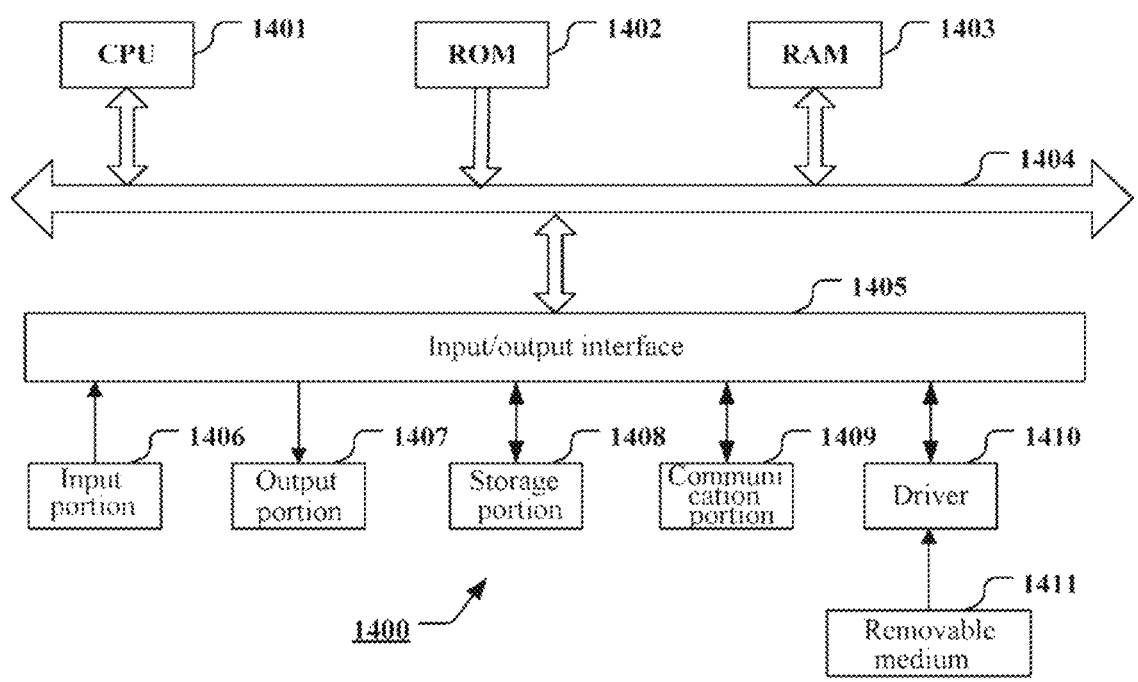
FIG. 7 is a block diagram showing an exemplary structure of a computer for implementing the methods and apparatuses according to the present disclosure.

In FIG. 7, an central processing unit (that is, a CPU) 1401 performs various processing in accordance with a program stored in a read only memory (ROM) 1402 or a program loaded from a storage portion 1408 to a random access memory (RAM) 1403. The data required for the various processing performed by the CPU 1401 may be stored in the RAM 1403 as needed. The CPU 1401, the ROM 1402 and the RAM 1403 are linked to each other via a bus 1404. An input/output interface 1405 is also linked to the bus 1404.

The following components are linked to the input/output interface 1405: an input portion 1406 (including a keyboard, a mouse or the like), an output portion 1407 (including a display such as a cathode ray tube (CRT), a liquid crystal display (LCD), a loudspeaker or the like), a storage portion 1408 (including a hard disk or the like), and a communication portion 1409 (including a network interface card such as a LAN card, a modem or the like). The communication portion 1409 performs communication processing via a network such as the Internet. A driver 1410 may also be linked to the input/output interface 1405 as needed. A removable medium 1411 such as a magnetic disk, an optical disk, a magneto-optical disk, a semiconductor memory may be installed on the driver 1410 as needed, so that a computer program read from the removable medium 1411 is installed into the storage portion 1408 as needed.

In a case that the above series of processing are implemented by software, a program constituting the software is installed from a network such as the Internet, or a storage medium such as the removable medium 1411.

Those skilled in the art should understand that the storage medium is not limited to the removable medium 1411 shown in FIG. 7 that stores a program and is distributed separately from the apparatus so as to provide the program to the user. The removable medium 1411, for example, may include: a magnetic disk (including a floppy disk (registered trademark)); an optical disk (including a compact disk read only memory (CD-ROM) and a digital versatile disc (DVD)); a magneto-optical disk (including a minidisc (MD) (registered trademark)); and a semiconductor memory. Alternatively, the storage medium may be the ROM 1402, a hard disk included in the storage portion 1408 or the like. The storage medium has a program stored therein and is distributed to the user together with an apparatus in which the storage medium is included.

A program product storing machine-readable instruction codes is further provided according to an embodiment of the present disclosure. The instruction codes, when being read and executed by a machine, may perform the methods according to the above embodiments of the present disclosure.

Accordingly, a storage medium for carrying the program product storing the machine-readable instruction codes is also provided according to the present disclosure. The storage medium may include but is not limited to a floppy disk, an optical disk, a magneto-optical disk, a memory card, a memory stick or the like.

The following electronic apparatus is involved in the embodiments of the present disclosure. In a case that the electronic apparatus is used for base station side, the electronic apparatus may be implemented as any type of gNB or evolved node B (eNB), such as a macro eNB and a small eNB. The small eNB may be an eNB of a cell having a smaller coverage than a macro cell, such as a pico-cell eNB, a micro eNB and a home (femto) eNB. Alternatively, the electronic apparatus may be implemented as any other types of base stations, such as a NodeB and a base transceiver station (BTS). The electronic apparatus may include: a main body (also referred to as a base station apparatus) configured to control the wireless communication; and one or more remote radio heads (RRH) provided at a different position from the main body. In addition, various types of terminals, which are described below, may each serve as a base station by performing functions of the base station temporarily or semi-persistently.

In a case that the electronic apparatus is used for user equipment side, the electronic apparatus may be implemented as a mobile terminal (such as a smartphone, a tablet personal computer (PC), a notebook PC, a portable game terminal, a portable/dongle mobile router and a digital camera) or a vehicle terminal (such as an automobile navigation apparatus). Furthermore, the electronic apparatus may be a wireless communication module (such as an integrated circuitry module including a single die or multiple dies) mounted on each of the terminals described above.

[Application Examples of a Terminal Apparatus]

Figure 8:
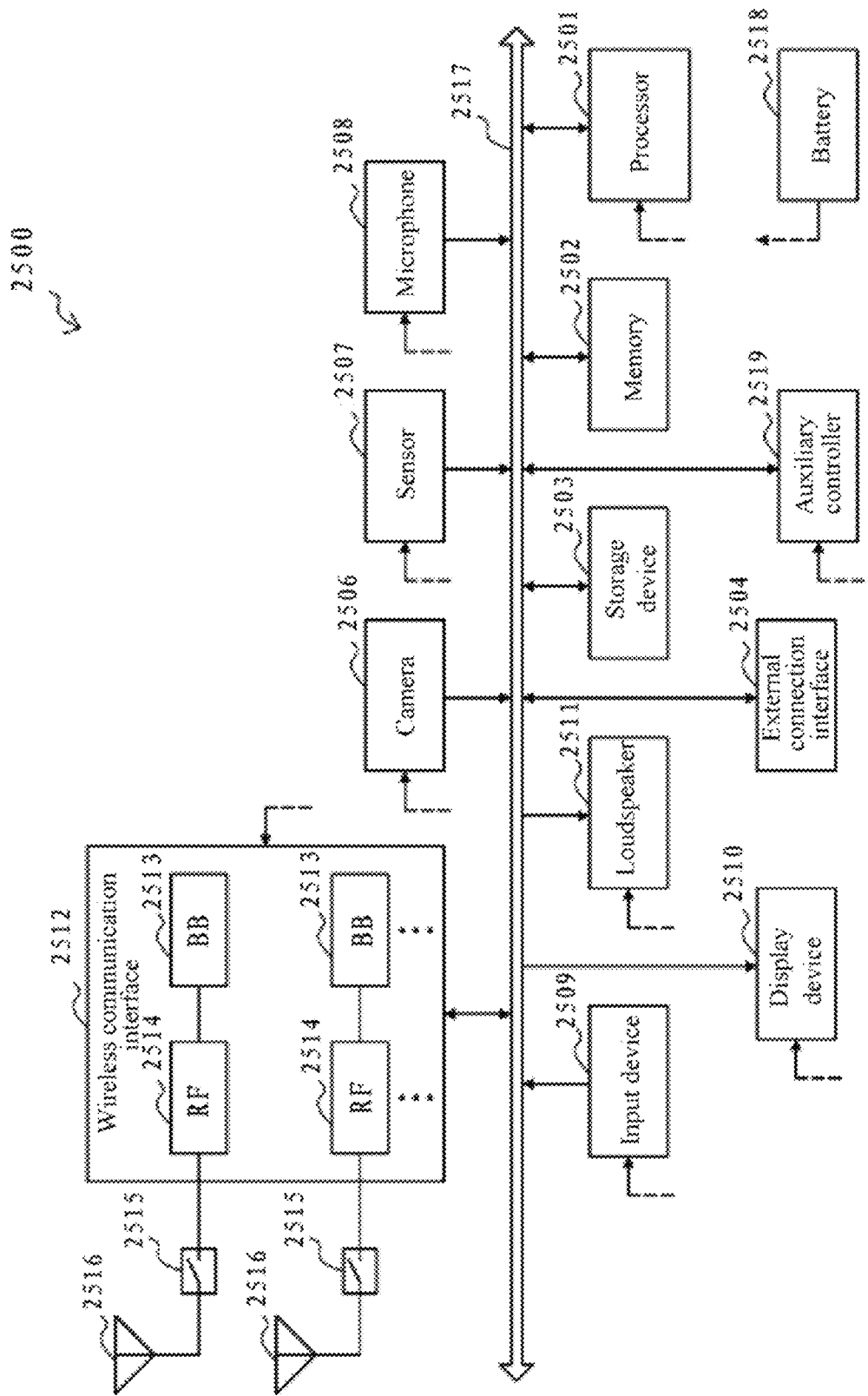
FIG. 8 is a block diagram showing an exemplary configuration of a smart phone to which technology according to the present disclosure may be applied.

FIG. 8 is a block diagram showing an exemplary configuration of a smartphone 2500 to which technology according to the present disclosure may be applied. The smartphone 2500 includes a processor 2501, a memory 2502, a storage device 2503, an external connection interface 2504, a camera 2506, a sensor 2507, a microphone 2508, an input device 2509, a display device 2510, a loudspeaker 2511, a wireless communication interface 2512, one or more antenna switches 2515, one or more antennas 2516, a bus 2517, a battery 2518 and an auxiliary controller 2519.

The processor 2501 may be, for example, a CPU or a system on chip (SoC), and controls functions of an application layer and another layer of the smartphone 2500. The memory 2502 includes an RAM and an ROM, and stores data and a program executed by the processor 2501. The storage device 2503 may include a storage medium such as a semiconductor memory and a hard disk. The external connection interface 2504 is an interface for connecting an external device (such as a memory card and a universal serial bus (USB) device) to the smartphone 2500.

The camera 2506 includes an image sensor (such as a charge coupled device (CCD) and a complementary metal oxide semiconductor (CMOS)), and generates a captured image. The sensor 2507 may include a group of sensors such as a measurement sensor, a gyro sensor, a geomagnetic sensor, and an acceleration sensor. The microphone 2508 converts sound that is inputted to the smartphone 2500 into an audio signal. The input device 2509 includes, for example, a touch sensor configured to detect touch on a screen of the display device 2510, a keypad, a keyboard, a button, or a switch, and receives an operation or information inputted from a user. The display device 2510 includes a screen (such as a liquid crystal display (LCD) and an organic light-emitting diode (OLED) display), and displays an output image of the smartphone 2500. The loudspeaker 2511 is configured to convert an audio signal outputted from the smartphone 2500 into sound.

The wireless communication interface 2512 supports any cellular communication scheme (such as LTE and LTE-Advanced), and performs wireless communication. The wireless communication interface 2512 may include, for example, a baseband (BB) processor 2513 and radio frequency (RF) circuitry 2514. The BB processor 2513 may perform, for example, coding/decoding, modulating/demodulating and multiplexing/de-multiplexing, and perform various types of signal processing for wireless communications. The RF circuitry 2514 may include, for example, a mixer, a filter and an amplifier, and transmits and receives a wireless signal via an antenna 2516. The wireless communication interface 2512 may be a chip module having the BB processor 2513 and the RF circuitry 2514 integrated thereon. As shown in FIG. 8, the wireless communication interface 2512 may include multiple BB processors 2513 and multiple RF circuitries 2514. Although FIG. 8 shows an example in which the wireless communication interface 2512 includes the multiple BB processors 2513 and the multiple RF circuitries 2514, the wireless communication interface 2512 may include a single BB processor 2513 or single RF circuitry 2514.

Besides the cellular communication scheme, the wireless communication interface 2512 may support an additional type of wireless communication scheme, such as a short-distance wireless communication scheme, a near field communication scheme and a wireless local area network (LAN) scheme. In this case, the wireless communication interface 2512 may include the BB processor 2513 and the RF circuitry 2514 for each wireless communication scheme.

Each of the antenna switches 2515 switches connection destinations of the antennas 2516 among multiple circuitry (such as circuitry for different wireless communication schemes) included in the wireless communication interface 2512.

Each of the antennas 2516 includes a single or multiple antenna elements (such as multiple antenna elements included in an MIMO antenna), and is used for the wireless communication interface 2512 to transmit and receive a wireless signal. The smartphone 2500 may include multiple antennas 2516, as shown in FIG. 8. Although FIG. 8 shows an example in which the smartphone 2500 includes the multiple antennas 2516, the smartphone 2500 may also include a single antenna 2516.

In addition, the smartphone 2500 may include an antenna 2516 for each type of wireless communication scheme. In this case, the antenna switches 2515 may be omitted from the configuration of the smartphone 2500.

The processor 2501, the memory 2502, the storage device 2503, the external connection interface 2504, the camera 2506, the sensor 2507, the microphone 2508, the input device 2509, the display device 2510, the loudspeaker 2511, the wireless communication interface 2512, and the auxiliary controller 2519 are connected to each other via the bus 2517. The battery 2518 supplies power to blocks of the smartphone 2500 shown in FIG. 8 via feeders which are partially shown with dashed lines in the drawings. The auxiliary controller 2519, for example, operates a minimum necessary function of the smartphone 2500 in a sleep mode.

In the smart phone 2500 shown in FIG. 8, the transceiving device of the apparatus for user equipment side according to an embodiment of the present disclosure may be implemented by the wireless communication interface 2512. At least a part of functions of the processing circuitry and/or units of the electronic device or the information processing apparatus for user equipment side according to the embodiments of the present disclosure may be implemented by the processor 2501 or the auxiliary controller 2519. For example, the auxiliary controller 2519 may perform a part of functions of the processor 2501, to reduce power consumption of the battery 2518. Further, the processor 2501 or the auxiliary controller 2519 may perform at least a part of functions of the processing circuitry and/or the units of the electronic device or the information processing apparatus for user equipment side according to the embodiments of the present disclosure by executing a program stored in the memory 2502 or the storage device 2503.

[Application Examples of a Base Station]

Figure 9:
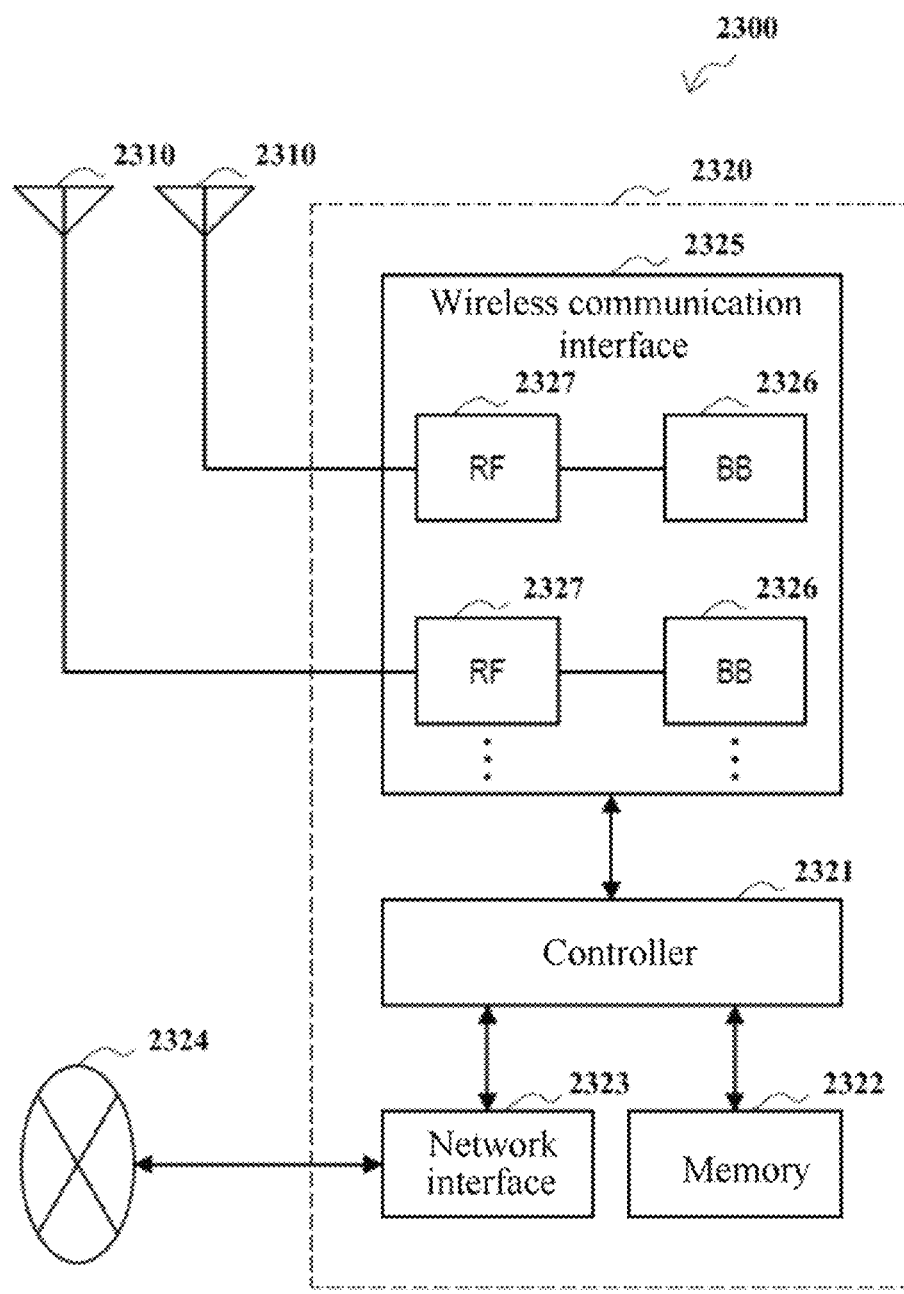
FIG. 9 is a block diagram showing an exemplary configuration of a gNB to which the technology according to the present disclosure may be applied.

FIG. 9 is a block diagram showing an exemplary configuration of a gNB to which the technology according to the present disclosure may be applied. A gNB 2300 includes multiple antennas 2310 and a base station apparatus 2320. Each of the antennas 2310 is connected to the base station apparatus 2320 via a radio frequency (RF) cable.

Each of the antennas 2310 includes a single antenna element or multiple antenna elements (such as multiple antenna elements included in a multiple-input multiple-output (MIMO) antenna), and is used for the base station apparatus 2320 to transmit and receive a wireless signal. The gNB 2300 may include multiple antennas 2310, as shown in FIG. 9. For example, the multiple antennas 2310 may be compatible with multiple frequency bands used by the gNB 2300. Although FIG. 9 shows an example in which the gNB 2300 includes multiple antennas 2310, the gNB 2300 may include a single antenna 2310.

The base station apparatus 2320 includes a controller 2321, a memory 2322, a network interface 2323 and a wireless communication interface 2325.

The controller 2321 may be, for example, a CPU or a DSP, and operate various functions of a high layer of the base station apparatus 2320. For example, the controller 2321 generates a data packet based on data in a signal processed by the wireless communication interface 2325 and transmits the generated packet via the network interface 2323. The controller 2321 may bundle data from multiple baseband processors to generate a bundled packet and transmit the generated bundled packet. The controller 2321 may have a logic function that performs control such as radio resource control, radio bearer control, mobility management, admission control, and scheduling. The control may be performed in combination with a nearby gNB or core network node. The memory 2322 includes an RAM and an ROM, and stores a program executed by the controller 2321 and various types of control data (such as a terminal list, transmission power data and scheduling data).

The network interface 2323 is a communication interface via which the base station apparatus 2320 is connected to a core network 2324. The controller 2321 may communicate with a core network node or another gNB via the network interface 2323. In this case, the gNB 2300 may be connected to the core network node or other gNB via a logical interface (such as an $S_1$ interface and an X2 interface). The network interface 2323 may also be a wired communication interface or a wireless communication interface for wireless backhaul line. If the network interface 2323 is the wireless communication interface, the network interface 2323 may use a frequency band for wireless communication higher than a frequency band used by the wireless communication interface 2325.

The wireless communication interface 2325 supports any cellular communication scheme (such as long term evolution (LTE) and LTE-Advanced), and provides wireless connection to a terminal positioned in a cell of the gNB 2300 via an antenna 2310. The wireless communication interface 2325 may include, for example, a BB processor 2326 and RF circuitry 2327. The BB processor 2326 may perform, for example, encoding/decoding, modulating/demodulating and multiplexing/de-multiplexing, and various types of signal processing of layers (such as L1, medium access control (MAC), radio link control (RLC) and packet data convergence protocol (PDCP)). Instead of the controller 2321, the BB processor 2326 may have a part or all of the above logic functions. The BB processor 2326 may be implemented as a memory storing a communication control program, or a module including a processor configured to execute a program and related circuitry. The function of the BB processor 2326 may be changed by updating the program. The module may be a card or blade inserted into a slot of the base station apparatus 2320. Alternatively, the module may be a chip mounted on the card or the blade. Further, the RF circuitry 2327 may include, for example, a mixer, a filter or an amplifier, and transmits and receives a wireless signal via the antenna 2310.

As shown in FIG. 9, the wireless communication interface 2325 may include multiple BB processors 2326. For example, the multiple BB processors 2326 may be compatible with multiple frequency bands used by the gNB 2300. As shown in FIG. 9, the wireless communication interface 2325 may include multiple RF circuitry 2327. For example, the multiple RF circuitry 2327 may be compatible with multiple antenna elements. Although FIG. 9 shows an example in which the wireless communication interface 2325 includes multiple BB processors 2326 and multiple RF circuitry 2327, the wireless communication interface 2325 may include a single BB processor 2326 or single RF circuitry 2327.

In the gNB 2300 shown in FIG. 9, the transceiving device of the wireless communication apparatus for base station side according to an embodiment of the present disclosure may be implemented by the wireless communication interface 2325. At least a part of functions of the processing circuitry and/or units of the electronic device or the wireless communication apparatus for base station side may be implemented by the controller 2321. For example, the controller 2321 may perform at least a part of functions of the processing circuitry and/or the units of the electronic device or the wireless communication apparatus for base station side by executing the program stored in the memory 2322.

In the above description of specific embodiments of the present disclosure, features described and/or illustrated for one embodiment may be used in one or more other embodiments in the same or similar manner, or may be combined with features in other embodiments, or may replace features in other embodiments.

It should be emphasized that terms of "include/comprise" used herein indicate presence of a feature, an element, a step, or a component, but do not exclude presence or addition of one or more other features, elements, steps or components.

In the above embodiments and examples, reference numerals consist of numbers are used to represent steps and/or units. Those skilled in the art should understand that these reference numerals are only for purpose of illustration and drawing and are not indicative of the order or any other limitations thereof.

In addition, the method according to the present disclosure is not limited to be performed in the chronological order described herein, and may be performed in other chronological order, in parallel or independently. Therefore, the order in which the method is performed described herein does not limit the technical scope of the present disclosure.

Although the present disclosure is described above through the specific embodiments of the present disclosure, it should be understood that all embodiments and examples described above are illustrative rather than restrictive. Various modifications, improvements and equivalents may be made to the present disclosure by those skilled in the art within the scope and spirit of the attached claims. These modifications, improvements or equivalents should fall within the protection scope of the present disclosure.

In addition, the embodiments of the present disclosure further include:

(1) An electronic device for wireless communication, comprising processing circuitry configured to:
perform control to perform carrier aggregation communication with a base station through at least a first cell and a second cell; and
perform control to transmit first information for beam failure recovery of the second cell to the base station through the first cell.

(2) The electronic device according to (1), wherein the first cell comprises a primary cell or a secondary cell having an uplink, and the second cell comprises a secondary cell having no uplink.

(3) The electronic device according to (1), wherein the first information comprises identification information of the second cell to which a beam failure occurs and identification information of a candidate beam for a beam failure recovery.

(4) The electronic device according to (3), wherein the processing circuitry is configured to transmit the identification information of the second cell and the identification information of the candidate beam through a physical uplink control channel PUCCH.

(5) The electronic device according to (4), wherein the PUCCH comprises an indicator bit for indicating that the PUCCH comprises the first information.

(6) The electronic device according to (1), wherein the processing circuitry is further configured to perform control to transmit second information for beam failure recovery of the first cell to the base station through the first cell.

(7) The electronic device according to (6), wherein the second information comprises identification information of a candidate beam, and the processing circuitry is configured to transmit the second information through a physical random access channel PRACH.

(8) The electronic device according to (1), wherein the processing circuitry is further configured to perform control to receive grouping information, wherein the grouping information indicates a plurality of cell subsets of a cell set for the carrier aggregation communication, each of the cell subsets containing at least one said first cell.

(9) The electronic device according to (8), wherein the grouping information is determined based on the following rule:
grouping co-located cells into a same cell subset; or
preferentially grouping cells having large differences in locations into a same cell subset.

(10) The electronic device according to (8), wherein the processing circuitry is further configured to perform control to receive information of a corresponding relationship between a cell and a cell identifier, and the corresponding relationship comprises:
a corresponding relationship between a physical cell identifier and a defined global identifier; or
a corresponding relationship between a physical cell identifier and defined group and local identifiers;
wherein the global identifier is used to identify a cell in the cell set, the group identifier is used to identify a cell subset, and the local identifier is used to identify a cell in a cell subset.

(11) The electronic device according to (10), wherein the first information transmitted to the base station comprises:
a global identifier of the second cell; or
a local identifier of the second cell in a cell subset comprising the second cell.

(12) The electronic device according to (8), wherein the processing circuitry is configured to perform control to receive the grouping information from the base station through radio resource control signaling.

(13) The electronic device according to (3), wherein the identification information of the candidate beam comprises a local identifier of the candidate beam in the second cell.

(14) The electronic device according to (2), wherein the processing circuitry is configured to make a beam failure recovery request based on one or more of the following rules:
  making a beam failure recovery request of the primary cell preferentially, in a case where beam failures occur to both the primary cell and the secondary cell; and
  making a beam failure recovery request of the secondary cell having an uplink preferentially, in a case where beam failures occur to both the secondary cell having an uplink and the secondary cell having no uplink.

(15) The electronic device according to (8), wherein the processing circuitry is configured to simultaneously make beam failure recovery requests through first cells in two or more cell subsets, in a case where beam failures occur to the two or more cell subsets.

(16) A wireless communication method, comprising:
  performing carrier aggregation communication with a base station through at least a first cell and a second cell; and
  transmitting first information for beam failure recovery of the second cell to the base station through the first cell.

(17) An electronic device for wireless communication, comprising processing circuitry configured to:
  perform control to perform carrier aggregation communication with user equipment through at least a first cell and a second cell; and
  perform control to receive first information for beam failure recovery of the second cell which is transmitted by the user equipment through the first cell.

(18) The electronic device according to (17), wherein the first cell comprises a primary cell or a secondary cell having an uplink, and the second cell comprises a secondary cell having no uplink.

(19) The electronic device according to (17), wherein the first information comprises identification information of the second cell to which a beam failure occurs and identification information of a candidate beam for a beam failure recovery.

(20) The electronic device according to (19), wherein the processing circuitry is configured to receive the identification information of the second cell and the identification information of the candidate beam through a physical uplink control channel PUCCH.

(21) The electronic device according to (17), wherein the processing circuitry is further configured to perform control to receive second information for beam failure recovery of the first cell from the user equipment through the first cell.

(22) The electronic device according to (21), wherein the second information comprises identification information of a candidate beam, and the processing circuitry is configured to receive the second information through a physical random access channel PRACH.

(23) The electronic device according to (17), wherein the processing circuitry is further configured to determine grouping information and perform control to transmit the grouping information to the user equipment, wherein the grouping information indicates a plurality of cell subsets of a cell set for the carrier aggregation communication, each of the cell subsets containing at least one said first cell.

(24) The electronic device according to (23), wherein the processing circuitry is further configured to determine a corresponding relationship between a cell and a cell identifier and perform control to transmit information of the corresponding relationship to the user equipment, and the corresponding relationship comprises:
  a corresponding relationship between a physical cell identifier and a defined global identifier; or
  a corresponding relationship between a physical cell identifier and defined group and local identifiers;
  wherein the global identifier is used to identify a cell in the cell set, the group identifier is used to identify a cell subset, and the local identifier is used to identify a cell in a cell subset.

(25) The electronic device according to (24), wherein the first information received from the user equipment comprises a global identifier of the second cell or a local identifier of the second cell in a cell subset comprising the second cell, and
  the processing circuitry is configured to: determine the second cell based on the global identifier, or determine the second cell based on the first cell and the local identifier.

(26) The electronic device according to (23), wherein the processing circuitry is configured to perform control to transmit the grouping information to the user equipment through radio resource control signaling.

(27) The electronic device according to (19), wherein the identification information of the candidate beam comprises a local identifier of the candidate beam in the second cell, and the processing circuitry is configured to determine the candidate beam based on the second cell and the local identifier.

(28) A wireless communication method, comprising:
  performing carrier aggregation communication with user equipment through at least a first cell and a second cell; and
  receiving first information for beam failure recovery of the second cell which is transmitted by the user equipment through the first cell.

(29) A computer readable medium comprising executable instructions that, when executed by an information processing apparatus, cause the information processing apparatus to execute the method according to (16) or (28).

The invention claimed is:

1. An electronic device for wireless communication, comprising processing circuitry configured to:
  perform control to perform carrier aggregation communication with a base station through at least a first cell and a second cell; and
  perform control to transmit first information for beam failure recovery of the second cell to the base station through the firs cell,
  wherein the first cell comprises a primary cell or a secondary cell having an uplink, and the second cell comprises a secondary cell having no uplink,
  wherein the processing circuitry is configured to make a beam failure recovery request based on one or more of the following rules:
  making a beam failure recovery request of the primary cell preferentially, in a case where beam failures occur to both the primary cell and at least one of the secondary cell having the uplink and the secondary cell having no uplink; and
  making a beam failure recovery request of the secondary cell having an uplink preferentially, in a case where beam failures occur to both the secondary cell having the uplink and the secondary cell having no uplink.

2. The electronic device according to claim 1, wherein the first information comprises identification information of the second cell to which a beam failure occurs and identification information of a candidate beam for a beam failure recovery.

3. The electronic device according to claim 2, wherein the processing circuitry is configured to transmit the identification information of the second cell and the identification information of the candidate beam through a physical uplink control channel PUCCH.

4. The electronic device according to claim 2, wherein the identification information of the candidate beam comprises a local identifier of the candidate beam in the second cell.

5. The electronic device according to claim 1, wherein the processing circuitry is further configured to perform control to transmit second information for beam failure recovery of the first cell to the base station through the first cell.

6. The electronic device according to claim 5, wherein the second information comprises identification information of a candidate beam, and the processing circuitry is configured to transmit the second information through a physical random access channel PRACH.

7. The electronic device according to claim 1, wherein the processing circuitry is further configured to perform control to receive grouping information, wherein the grouping information indicates a plurality of cell subsets of a cell set for the carrier aggregation communication, each of the cell subsets containing at least one said first cell.

8. The electronic device according to claim 7, wherein the processing circuitry is further configured to perform control to receive information of a corresponding relationship between a cell and a cell identifier, and the corresponding relationship comprises:
   a corresponding relationship between a physical cell identifier and a defined global identifier; or
   a corresponding relationship between a physical cell identifier and defined group and local identifiers;
   wherein the global identifier is used to identify a cell in the cell set, the group identifier is used to identify a cell subset, and the local identifier is used to identify a cell in a cell subset.

9. The electronic device according to claim 8, wherein the first information transmitted to the base station comprises:
   a global identifier of the second cell; or
   a local identifier of the second cell in a cell subset comprising the second cell.

10. The electronic device according to claim 7, wherein the processing circuitry is configured to simultaneously make beam failure recovery requests through first cells in two or more cell subsets, in a case where beam failures occur to the two or more cell subsets.

11. An electronic device for wireless communication, comprising processing circuitry configured to:
   perform control to perform carrier aggregation communication with user equipment through at least a first cell and a second cell; and
   perform control to receive first information for beam failure recovery of the second cell which is transmitted by the user equipment through the first cell,
   wherein the first cell comprises a primary cell or a secondary cell having an uplink, and the second cell comprises a secondary cell having no uplink,
   wherein the processing circuitry is configured to receive a beam failure recovery request based on one or more of the following rules:
   receiving a beam failure recovery request of the primary cell preferentially, in a case where beam failures occur to both the primary cell and at least one of the secondary cell having the uplink and the secondary cell having no uplink; and
   receiving a beam failure recovery request of the secondary cell having an uplink preferentially, in a case where beam failures occur to both the secondary cell having the uplink and the secondary cell having no uplink.

12. The electronic device according to claim 11, wherein the first information comprises identification information of the second cell to which a beam failure occurs and identification information of a candidate beam for a beam failure recovery.

13. The electronic device according to claim 12, wherein the processing circuitry is configured to receive the identification information of the second cell and the identification information of the candidate beam through a physical uplink control channel PUCCH.

14. The electronic device according to claim 11, wherein the processing circuitry is further configured to perform control to receive second information for beam failure recovery of the first cell from the user equipment through the first cell.

15. The electronic device according to claim 14, wherein the second information comprises identification information of a candidate beam, and the processing circuitry is configured to receive the second information through a physical random access channel PRACH.

16. The electronic device according to claim 11, wherein the processing circuitry is further configured to determine grouping information and perform control to transmit the grouping information to the user equipment, wherein the grouping information indicates a plurality of cell subsets of a cell set for the carrier aggregation communication, each of the cell subsets containing at least one said first cell.

17. The electronic device according to claim 16, wherein the processing circuitry is further configured to determine a corresponding relationship between a cell and a cell identifier and perform control to transmit information of the corresponding relationship to the user equipment, and the corresponding relationship comprises:
   a corresponding relationship between a physical cell identifier and a defined global identifier; or
   a corresponding relationship between a physical cell identifier and defined group and local identifiers;
   wherein the global identifier is used to identify a cell in the cell set, the group identifier is used to identify a cell subset, and the local identifier is used to identify a cell in a cell subset.

* * * * *